US012688515B2

(12) United States Patent
Lowinger

(10) Patent No.: US 12,688,515 B2
(45) Date of Patent: *Jul. 21, 2026

(54) USER INTERFACE OF SYSTEM FOR CLASSIFICATION AND ATTRIBUTION OF ARTWORK FOR AUTHENTICATION AND VALUATION

(71) Applicant: Artizan Technologies, Inc, Wilmington, DE (US)

(72) Inventor: Robert Lowinger, Miami, FL (US)

(73) Assignee: Artizan Technologies, Inc, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/321,120

(22) Filed: Sep. 5, 2025

(65) Prior Publication Data
US 2026/0065310 A1      Mar. 5, 2026

Related U.S. Application Data

(60) Provisional application No. 63/691,316, filed on Sep. 5, 2024, provisional application No. 63/691,315, filed on Sep. 5, 2024.

(51) Int. Cl.
G06Q 30/0201      (2023.01)
G06Q 30/018      (2023.01)
(Continued)

(52) U.S. Cl.
CPC ..... *G06Q 30/0206* (2013.01); *G06Q 30/0185* (2013.01); *G06Q 30/0278* (2013.01);
(Continued)

(58) Field of Classification Search
None
See application file for complete search history.

(56) References Cited

U.S. PATENT DOCUMENTS

2013/0002903 A1* 1/2013 Manico .............. G06Q 50/2057
                                                    348/222.1
2015/0120580 A1* 4/2015 Pabst .................... G06Q 30/02
                                                    705/306
(Continued)

OTHER PUBLICATIONS

Powell, et al., "Applying analytics to artist provided text to model prices of fine art," 2020, In "Complex Pattern Mining: New Challenges, Methods and Applications," Springer International Publishing, pp. 189-211 (Year: 2020).*

*Primary Examiner* — Ivan R Goldberg
(74) *Attorney, Agent, or Firm* — FP; Sikander M. Khan

(57)      ABSTRACT

A system and method for analyzing an artwork through a user interface integrated with advanced computer vision and artificial intelligence techniques is described. The system comprises one or more processors, a memory, and a display configured to present a graphical user interface (GUI) for receiving an image of an artwork and associated details including artist, title, year, medium, material, and dimensions. An image processing module pre-processes the received image, and a computer vision module generates visual embeddings which are combined, by an artificial intelligence engine, with contextual data from a metadata library and a statistical identifiers database. An authentication unit produces an authentication output comprising an authentication status, confidence score, and factor-level indicators, while a valuation probability calculator applies probabilistic modeling to generate valuation probabilities with anomaly indications and graphical visualizations. The GUI presents authentication results, valuation probabilities, and interactive reports, enabling curation, inventory management, and expert feedback.

16 Claims, 22 Drawing Sheets

(51) Int. Cl.

| | | |
|---|---|---|
| *G06Q 30/02* | (2023.01) | |
| *G06V 10/80* | (2022.01) | |
| *G06V 10/82* | (2022.01) | |
| *G06V 20/00* | (2022.01) | |

(52) U.S. Cl.
 CPC ............ *G06V 10/806* (2022.01); *G06V 10/82*
 (2022.01); *G06V 20/95* (2022.01)

(56) References Cited

U.S. PATENT DOCUMENTS

| | | | |
|---|---|---|---|
| 2016/0019554 A1* | 1/2016 | MacDonald-Korth | ...................... G06Q 30/0278 705/317 |
| 2021/0082051 A1* | 3/2021 | Moses | ................ G06Q 30/0278 |
| 2021/0319240 A1* | 10/2021 | Demir | .................... G06N 3/044 |
| 2021/0374449 A1* | 12/2021 | McConnell | ........ G06V 30/2253 |
| 2022/0229924 A1* | 7/2022 | Pevzner | ............. G06Q 30/0283 |
| 2024/0129286 A1* | 4/2024 | Coulson | ............. G06F 21/6209 |

* cited by examiner

Inference Logic 900

Attention
Output a → Concatenation $$a_t = \sum_{i=1}^{N} \alpha_i^t * h_i$$

Attention
Distribution
α

$\alpha^t = softmax(e^t)$

Attention
Scores
e $e^t = [s_t^T h_1, \ldots, s_t^T h_N]$

Encoder
Hidden
States

Decoder
Hidden
State

Inference Logic 900

Inference Logic 900

Inference Logic 900

Inference Logic 900

```
batch_size = tf.shape(x)[0]

x = self.rescale(x)

patches = self.extract_patches(x)

x = self.patch_proj(patches)

class_emb = tf.broadcast_to(
    self.class_emb, [batch_size, 1, self.d_model]
)

x = tf.concat([class_emb, x], axis=1)

x = x + self.pos_emb for layer in self.enc_layers:
    x = layer(x, training)

return self.mlp_head(x[:, 0])
```

FIG. 18

USER INTERFACE OF SYSTEM FOR CLASSIFICATION AND ATTRIBUTION OF ARTWORK FOR AUTHENTICATION AND VALUATION

CROSS-REFERENCE AND RELATED APPLICATIONS

The present Non-Provisional application claims priority to U.S. Provisional Application No. 63/691,315, entitled, "System And Method For Identifying And Analyzing Artworks Based On Convolutional Neural Network," filed on Sep. 5, 2024, and U.S. Provisional Application No. 63/691,316, entitled, "System And Method For Classification And Attribution Of An Artwork For Valuation," filed on Sep. 5, 2024, both of which are herein incorporated by reference in their entirety.

FIELD OF THE TECHNOLOGY DISCLOSED

The technology disclosed relates to artificial intelligence type computers and digital data processing systems and corresponding data processing methods and products for emulation of intelligence (i.e., knowledge based systems, reasoning systems, and knowledge acquisition systems); and including systems for reasoning with uncertainty (e.g., fuzzy logic systems), adaptive systems, machine learning systems, and artificial neural networks.

The present disclosure relates to the field of art analysis and valuation, specifically focusing on the use of advanced computer vision (CV) and artificial intelligence (AI) technologies to identify, authenticate, and predict the market value of artworks.

BACKGROUND

Technical Field

The present disclosure relates to the field of art analysis and valuation, specifically focusing on the use of advanced computer vision (CV) and artificial intelligence (AI) technologies to identify, authenticate, and predict the market value of artworks.

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Deep learning is a frontier for artificial intelligence, aiming to be closer to its primary goal—artificial intelligence. Deep learning has seen great success in a wide variety of applications, such as natural language processing, speech recognition, medical applications, computer vision, and intelligent transportation systems. The great success of deep learning is due to the larger models. The scale of these models has included hundreds of millions of parameters. These hundreds of millions of parameters allow the model to have more degrees of freedom enough to produce awe-inspiring description capability.

However, the large number of parameters requires a massive amount of training data with labels. Improving model performance by data annotation has two crucial challenges. On the one hand, the data growth rate is far behind the growth rate of model parameters, so data growth has primarily hindered the further development of the model. On the other hand, the emergence of new tasks has far exceeded the speed of data updates, and annotating for all samples is laborious.

To tackle this challenge, new datasets are built by generating synthetic samples, thereby speeding up model iteration and reducing the cost of data annotation. Pre-training methods and transfer learning have also been used to solve this challenge, such as Transformers, BERT, and GPT. These works have achieved incredible results.

However, the generated data is only used as base data to initialize the model. In order to obtain a high-precision usable model, it is often necessary to label and update specific data.

Integrating apriori knowledge in the learning framework is an effective means to deal with sparse data, as the learner does not need to induce the knowledge from the data itself. As special agents, humans have rich prior knowledge. If the machine can learn human wisdom and knowledge, it will help deal with sparse data.

Human-in-the-loop (HITL) addresses these issues by incorporating human knowledge into the modeling process. HITL aims to train an accurate prediction model with minimum cost by integrating human knowledge and experience. Humans can provide training data for machine learning applications and directly accomplish some tasks that are hard for computers in the pipeline with the help of machine-based approaches.

At present, there is still a high degree of coupling between deep learning tasks and data, and the performance of deep learning largely depends on the quality of the data. For a new task, if you want to obtain better performance, you need to provide a large amount of high-quality labeled data. However, the labeled data requires a large amount of labor. In addition, large-scale data annotation takes a long time, and many iterations of tasks cannot wait such a long time. Unlike weak annotate and automatic annotate, HITL-based methods emphasize finding the key samples that play a decisive factor in new sample data.

A core set is a weighted subset of a larger set. A core set guarantees that a model fitting the core set also fits the larger set. Core set construction methods perform importance sampling with respect to sensitivity score, to provide high-probability solutions for a particular problem, such as k-means and k-median clustering, naïve Bayes and nearest-neighbors, mixture models, low rank approximation, spectral approximation, Nystrom methods, and Bayesian inference.

Supervised learning usually requires a large set of labeled data to train the prediction model. As the learning algorithms become more and more complicated, the required size of training set gets larger and larger. Meanwhile, labeling data examples is rather expensive, because the annotation process is usually time-consuming and needs high expertise in some difficult tasks. It is thus a significant challenge to learn with insufficient labeled data.

Active learning is a primary approach to overcome this challenge. It iteratively selects the most useful examples from the unlabeled dataset to query their labels from the oracle. After adding the newly labeled data into the training set, the model can be updated to achieve better performance. The key task in active learning is how to accurately estimate the potential utility of an example on improving the performance, such that the model can be well trained with minimal queries.

Description of Related Art

The evaluation and valuation of artworks are critical in the art market, influencing decisions made by collectors, investors, and galleries. Traditional methods of artwork evaluation, which often rely on the expertise of art historians and appraisers, can be subjective, time-consuming, and prone to human error. The advent of digital technologies, particularly computer vision (CV) and artificial intelligence (AI), has opened new possibilities for enhancing the accuracy and efficiency of art analysis and valuation.

Art analysis involves examining various aspects of an artwork, including its style, technique, materials, and provenance. The art market is characterized by high-stakes transactions where the value of a single artwork can reach millions of dollars. For instance, Pablo Picasso's "Les Demoiselles d'Avignon," a seminal work in the history of modern art, is highly valuable not only for its artistic innovation but also for its historical significance. Determining the authenticity and value of such artworks involves complex considerations, including provenance, condition, historical context, and market demand.

Forgery and counterfeit artworks pose significant threats to the art market. Forgers can create sophisticated imitations of famous artworks, deceiving even experienced collectors and experts. For example, a forged version of Picasso's "Le Rêve" could be passed off as genuine, potentially leading to significant financial losses and reputational damage for the buyer. Traditional authentication methods, which may include provenance research and stylistic analysis, can be insufficient to detect high-quality forgeries. Advanced CV algorithms can help in recognizing and distinguishing different artistic styles and subjects, providing a more reliable means of authentication.

Art auctions and sales also present challenges in determining the accurate market value of artworks. Predicting the market price involves considering various factors such as the artist's reputation, the artwork's provenance, the condition of the piece, and current market trends. Existing technologies often fall short in providing a comprehensive analysis that encompasses all these factors. Current technologies in artwork identification include basic image recognition and metadata analysis. However, these methods have several technical shortcomings. They often lack the ability to accurately differentiate between similar styles or to identify specific subjects within an artwork. Moreover, they may not integrate various data sources, such as historical sales data, social media trends, and expert opinions, to provide a holistic valuation.

A significant challenge in the art market is the limited availability of comprehensive visual data for certain artists. For example, evaluating the works of Pablo Picasso requires access to not only his famous paintings but also his lesser-known sketches and sculptures. This necessitates partnerships with art historians and institutions to compile a rich and diverse dataset for accurate valuation and authentication.

Advanced computer vision techniques, such as convolutional neural networks (CNNs), generative adversarial networks (GANs), and recurrent neural networks (RNNs), are employed to enhance the analysis and classification of artworks. These image classification algorithms can identify and differentiate between various artistic styles, detect specific features like signatures, and classify the subjects within the artwork. By analyzing high-quality images of artworks, these algorithms can extract detailed visual features that contribute to the overall evaluation and authentication process.

Historical data plays a crucial role in the authentication and valuation of artworks. This data includes provenance records, historical sales data, exhibition histories, and expert evaluations. By integrating this historical data with advanced CV and AI technologies, the system can provide a comprehensive analysis that considers both visual and contextual information. For instance, Bayesian networks can be used to combine visual data from the artwork with historical data to determine the probability of an artwork's value increasing or decreasing over time.

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display. Exemplary manipulations include adjusting the position and/or size of one or more user interface objects or activating buttons or opening files/applications represented by user interface objects, as well as associating metadata with one or more user interface objects or otherwise manipulating user interfaces. Exemplary user interface objects include digital images, video, text, icons, control elements such as buttons and other graphics. A user will, in some circumstances, need to perform such manipulations on user interface objects in a file management program, an image management application, a digital content management application, a drawing application, a presentation application, a word processing application, a website creation application, a disk authoring application, or a spreadsheet application.

But existing methods for performing these manipulations are cumbersome and inefficient. In addition, existing methods take longer than necessary, thereby wasting energy. This latter consideration is particularly important in battery-operated devices.

Each of the aforementioned challenges necessitates the development of a system that integrates advanced computer vision and AI technologies with a user-friendly graphical user interface to provide a comprehensive and reliable method for art analysis and valuation. Such a system would address the limitations of traditional methods, enhancing the accuracy and efficiency of the evaluation process. The objective is to develop a robust tool that combines visual and historical data, employing Bayesian networks to determine the probability of an artwork's value increasing or decreasing. By integrating these technologies and providing an intuitive GUI for user interaction, the system aims to offer a more accurate, reliable, and efficient means of authenticating and valuing artworks, benefiting retail art investors, gallerists, and other stakeholders in the art market.

SUMMARY

In one exemplary embodiment, a system for analyzing an artwork is described. The system comprises one or more processors, a display operably coupled to the one or more processors, and a memory accessible by the processor, the memory storing instructions that when executed by the processor implement a method. The method comprises displaying, via the display, a graphical user interface (GUI), wherein the GUI includes an image capture option for receiving an image of an artwork from the user. The method further comprises pre-processing the received image to enhance image quality for analysis, analyzing, by a computer vision module, the pre-processed image to generate visual embeddings representing features of the artwork, and combining, by an artificial intelligence engine, the visual embeddings with contextual data obtained from a metadata library and a statistical identifiers database to generate feature representations. The method further comprises generating, by an authentication unit, an authentication output indicative of authenticity of the artwork, determining, by a valuation probability calculator, a valuation probability by applying at least one probabilistic model to integrate the feature representations, the authentication output, and contextual market data, and displaying, through the GUI on the display unit, graphical visualizations of the authentication output and the valuation probability corresponding to the artwork. The method further comprises enabling user interaction with the GUI to view detailed information related to the identified art identifiers and valuation probability.

In another exemplary embodiment, a system for analyzing a subject matter of an image is described. The system comprises one or more processors, a display operably coupled to the one or more processors, and memory accessible by the processor, the memory storing instructions that when executed by the processor implement a method. The method comprises displaying, via the display unit, a graphical user interface (GUI) an image capture option for receiving an image from the user. The method further comprises pre-processing the received image to enhance image quality for analysis, analyzing the pre-processed image using a computer vision module integrated with an artificial intelligence engine, and identifying art identifiers associated with the image based on at least one data source comprising a metadata library and a statistical identifiers database. The method further comprises generating an authentication output indicating whether the artwork corresponds to a claimed artist or style, displaying, through the GUI on the display unit, the authentication output corresponding to the subject matter of the image, and enabling user interaction with the GUI to view detailed information related to the image identifiers and valuation probability.

In another exemplary embodiment, a method for analyzing an artwork is described. The method comprises displaying, via the display unit, a graphical user interface (GUI) an image capture option for receiving an image of an artwork from the user. The method further comprises pre-processing the received image to enhance image quality for analysis, extracting, by an art analyzer, visual features of the image using a computer vision module integrated with an artificial intelligence engine, and retrieving, by the art analyzer, contextual data associated with the artwork from at least one data source. The method further comprises combining, by a valuation calculator, the extracted visual features with the contextual data and market-related data, determining, by the valuation calculator, a valuation probability indicating a probable change in the valuation of the artwork, and displaying, on a graphical user interface (GUI), the analyzed results including the identified art identifiers and calculated valuation probability.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 18 shows example software code that implements a Transformer block.

DETAILED DESCRIPTION

Figure 1A:
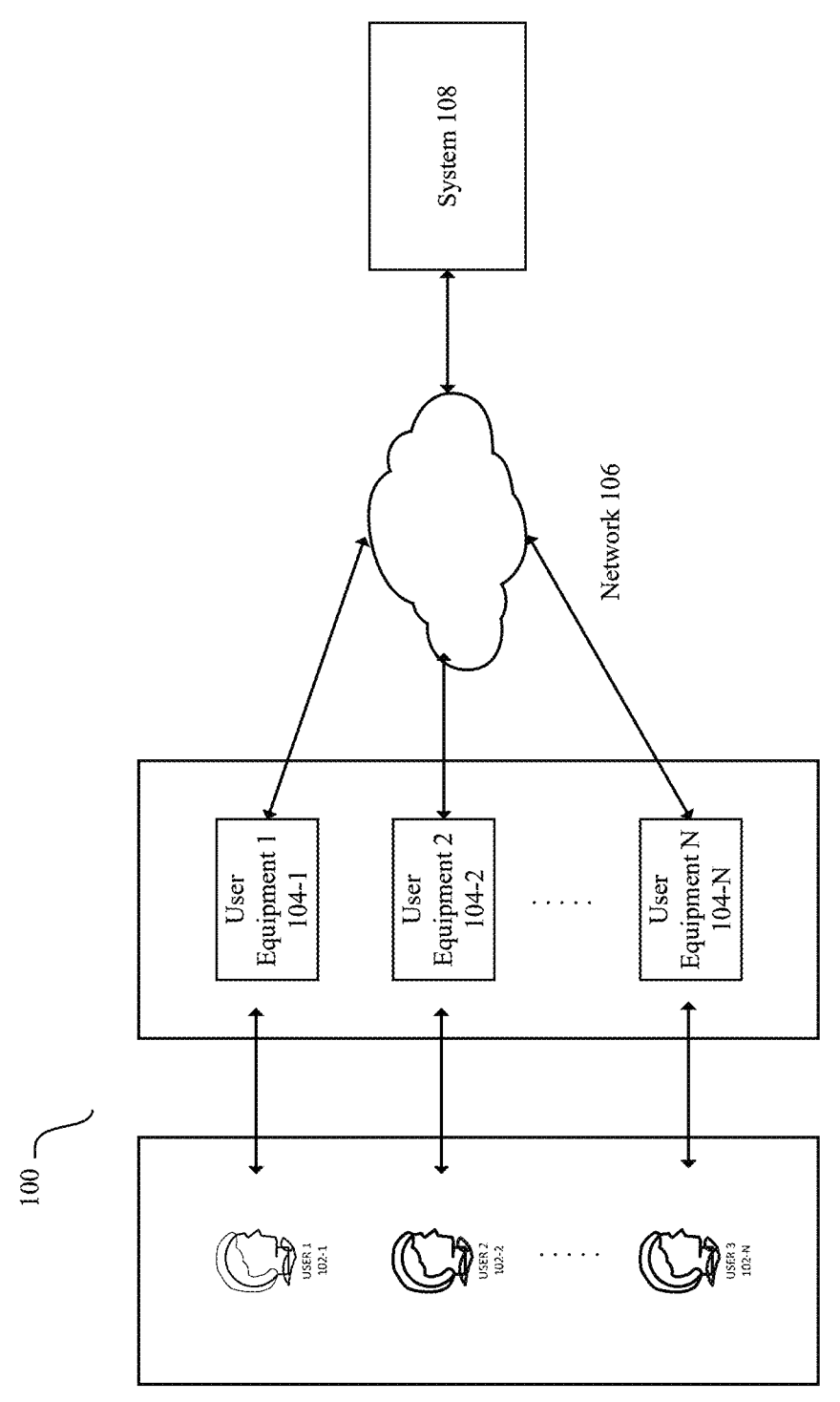
FIG. 1A illustrates an exemplary network architecture in which a system for authenticating and valuating an artwork in a communication network is implemented, according to certain embodiments.

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address any of the problems discussed above or might address only some of the problems discussed above. Some of the problems discussed above might not be fully addressed by any of the features described herein. Example embodiments of the present disclosure are described below, as illustrated in various drawings in which like reference numerals refer to the same parts throughout the different drawings.

Furthermore, the terms "approximately," "approximate", "about" and similar terms generally refer to ranges that include the identified value within a margin of 20%, 10%, or preferably 5%, and any values therebetween.

INTRODUCTION

The art market faces persistent challenges in authenticating artworks and accurately determining their value. Traditional evaluation methods, reliant on expert judgment, are subjective, time-consuming, and vulnerable to forgeries and market volatility. Existing digital tools often lack integration of diverse data sources, such as visual features, metadata, historical sales, and sentiment indicators, resulting in incomplete or unreliable analysis.

The disclosed system addresses these limitations by providing an integrated framework comprising a graphical user interface, a computer vision module, and an artificial intelligence engine. The system combines pre-processed image features with metadata curated by experts and statistical identifiers, applies probabilistic modeling, and generates authentication outputs and valuation probabilities. The results, including confidence scores, anomaly detections, and graphical visualizations, are displayed through an interactive interface. This comprehensive solution improves reliability, transparency, and efficiency in art authentication and valuation, benefiting collectors, investors, and galleries.

Exemplary Network Architecture

FIG. 1A illustrates an exemplary network architecture 100 in which a system 108 for identifying and analysing an artwork in a communication network is implemented, in accordance with embodiments of the present disclosure.

The network architecture 100 includes one or more computing devices or user equipment 104-1, 104-2 . . . 104-N associated with one or more users 102-1, 102-2 . . . 102-N in an environment. These computing devices can include, but are not limited to, smart devices operating in a smart environment, such as an Internet of Things (IoT) system. Examples of user equipment 104 include smartphones, smartwatches, smart sensors, networked appliances, communication devices, tablets, smart televisions, computers, and other devices for monitoring or interacting with users 102.

The user equipment 104 is configured to communicate with the system 108 through a network 106. The network 106 may include various communication technologies such as a Fifth Generation (5G) network, 6G network, wide area network (WAN), local area network (LAN), wireless network, mobile network, Virtual Private Network (VPN), the Internet, or the Public Switched Telephone Network (PSTN).

In an embodiment, the user equipment 104 includes handheld wireless communication devices, wearable computer devices, Global Positioning System (GPS) devices, laptop computers, tablet computers, media playing devices, portable gaming systems, and other types of portable computer devices with wireless communication capabilities.

Each user equipment 104 is equipped with processing engines or microcontrollers that execute the mobile application. These microcontrollers handle various tasks such as processing user inputs, executing application logic, and managing communication with the central system.

The user equipment 104 may also include electrical, electronic, electro-mechanical, or a combination of devices such as virtual reality (VR) devices, augmented reality (AR) devices, personal digital assistants, mainframe computers, or other computing devices. These devices may have in-built or externally coupled accessories such as cameras, microphones, keyboards, touchpads, touch-enabled screens, electronic pens, and other input devices for receiving input from the user 102. In one aspect, the cameras are used to capture high-quality images of artworks. These images are then processed and analyzed by the system 108 to provide functionalities like art analysis and valuation.

The system 108 includes the inventory module within the user equipment 104 allows users to upload images of artworks. The module ensures that the images are stored securely and are accessible for further processing and analysis. The system 108 further includes an image processing module 204 to preprocess the uploaded images to enhance their quality and prepare them for detailed analysis. The preprocessing steps may include noise reduction, contrast enhancement, and segmentation to detect specific features of the artwork. The system 108 further includes a computer vision unit, integrated with the system 108, and utilizes advanced machine learning models, such as convolutional neural networks (CNNs) and generative adversarial networks (GANs), to analyze the preprocessed images. The computer vision unit identifies key features of the artwork, including subject matter, artist identification, and signature presence. The system 108 utilizes an artificial intelligence (AI) engine is configured for identifying various attributes of artworks. The AI engine is trained using a combination of visual features and metadata associated with the artwork and the artist. The system 108 further includes a valuation probability calculator which calculates the valuation probability, indicating the likely increase or decrease in the value of the artwork based on the analysis conducted by the AI engine.

In one embodiment, the system 108 for art authentication and valuation, according to certain embodiments of the present disclosure, is configured to receive an image of an artwork from a user device via an inventory module, to pre-process the image in an image processing module, and to analyze the pre-processed image through a computer vision module and an artificial intelligence engine for generating authentication and valuation outputs. The computer vision module extracts low-level and high-level visual features including brushstrokes, textures, shapes, and colour distributions, while the artificial intelligence engine combines these visual embeddings with contextual data obtained from a metadata library and a statistical identifiers database stored in a centralized repository, thereby producing feature representations. An authentication unit generates an authentication output indicative of the authenticity of the artwork, and a valuation probability calculator applies probabilistic models, including Bayesian networks, together with anomaly detection logic to generate a valuation probability output. Both the authentication output and the valuation output are transmitted to a display unit of the user equipment, enabling real-time, explainable, and continuously updated art authentication and valuation accessible to investors, collectors, and gallerists.

In one embodiment, a non-transitory computer-readable storage medium stores instructions that, when executed by a processor, cause the processor to perform the operations of the system 108 as described earlier.

Figure 1B:
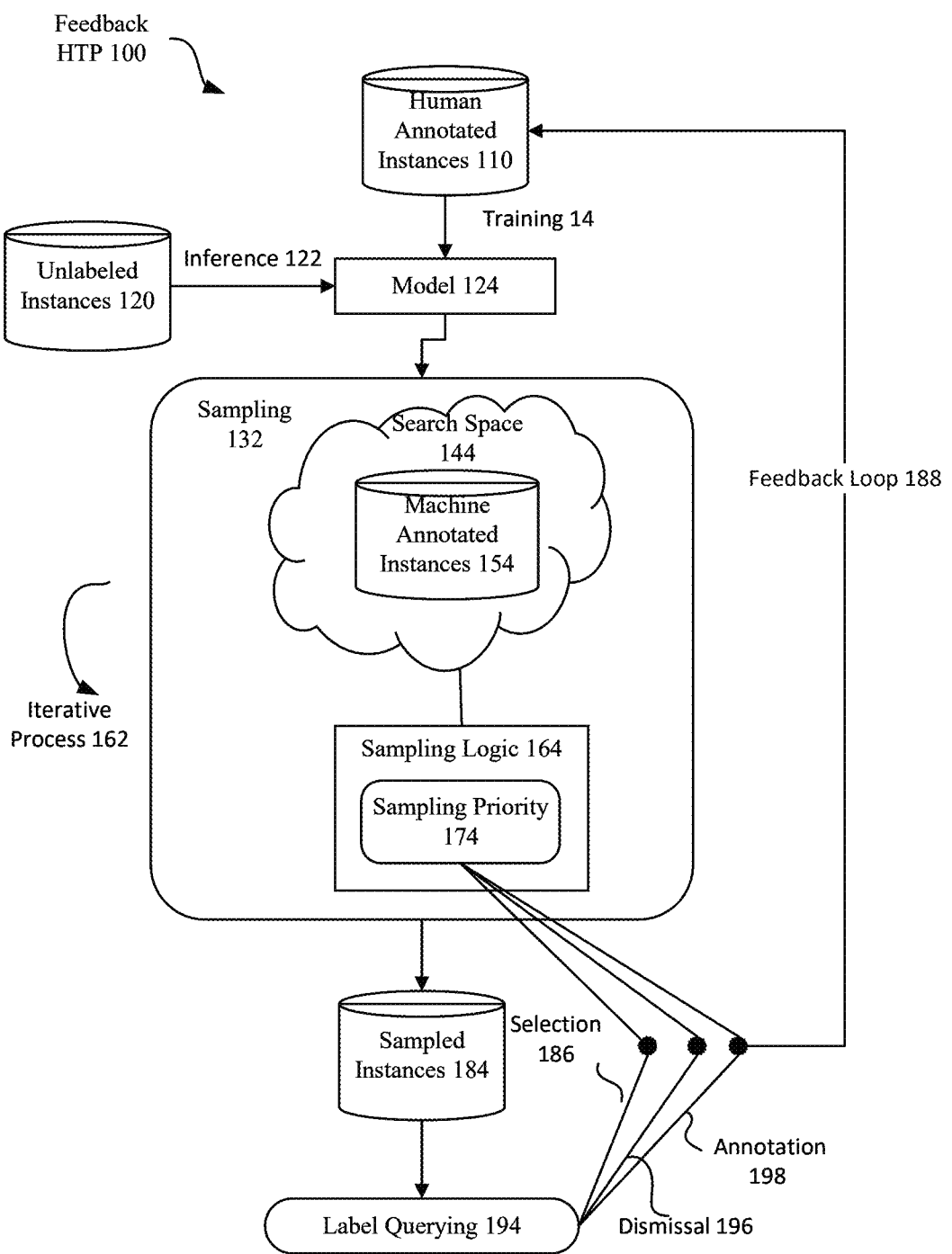
FIG. 1B illustrates one implementation of a human-in-the-loop (HITL) active learning environment, according to certain embodiments.

FIG. 1B illustrates a human-in-the-loop training process (HTP 100) implemented within the system 108 for art authentication and valuation, according to certain embodiments of the present disclosure. The process depicted in FIG. 1B demonstrates how machine learning models are iteratively refined using human-annotated instances, machine-annotated instances, and continuous feedback.

The HTP 100 comprises a set of human annotated instances 110 and a set of machine annotated instances 154. Human annotated instances 110 represent artwork images or metadata that have been labeled and verified by domain experts, whereas machine annotated instances 154 represent automatically generated annotations derived from initial model predictions. Both sets of annotations contribute to enlarging and diversifying the training dataset.

The HTP 100 further comprises a search space 144 that includes unlabeled instances 120 representing artwork images or metadata for which no labels have yet been assigned. A sampling logic 164 is applied over the search space 144 to determine which instances are to be queried for labeling. Based on a sampling priority 174, selected instances are identified as sampled instances 184 and are routed for further evaluation.

The sampled instances 184 are processed through label querying 194, selection 186, and feedback loop 188, enabling human experts to confirm, refine, or reject machine-provided labels. An iterative process 162 governs this cycle, ensuring that both human and machine contributions are continuously harmonized. As part of the process, instances may also be routed through dismissal 196 when they are deemed irrelevant or noisy, or through annotation 198 when they require new or corrected expert labeling.

The HTP 100 further comprises training 14 and inference 122 stages, which are operatively connected to the model 124. During training 14, the model 124 ingests annotated instances from both human and machine sources, refining predictive weights through iterative updates. During inference 122, the trained model 124 generates predictions on new data, with outputs feeding back into the cycle via feedback 198 and feedback loop 188 to further improve accuracy.

The continuous integration of annotated data, guided by sampling logic 164, search space 144, and feedback mechanisms, ensures that the model 124 evolves adaptively in response to expert input and changing market or stylistic conditions.

System for Artwork Authentication and Valuation

Figure 2A:
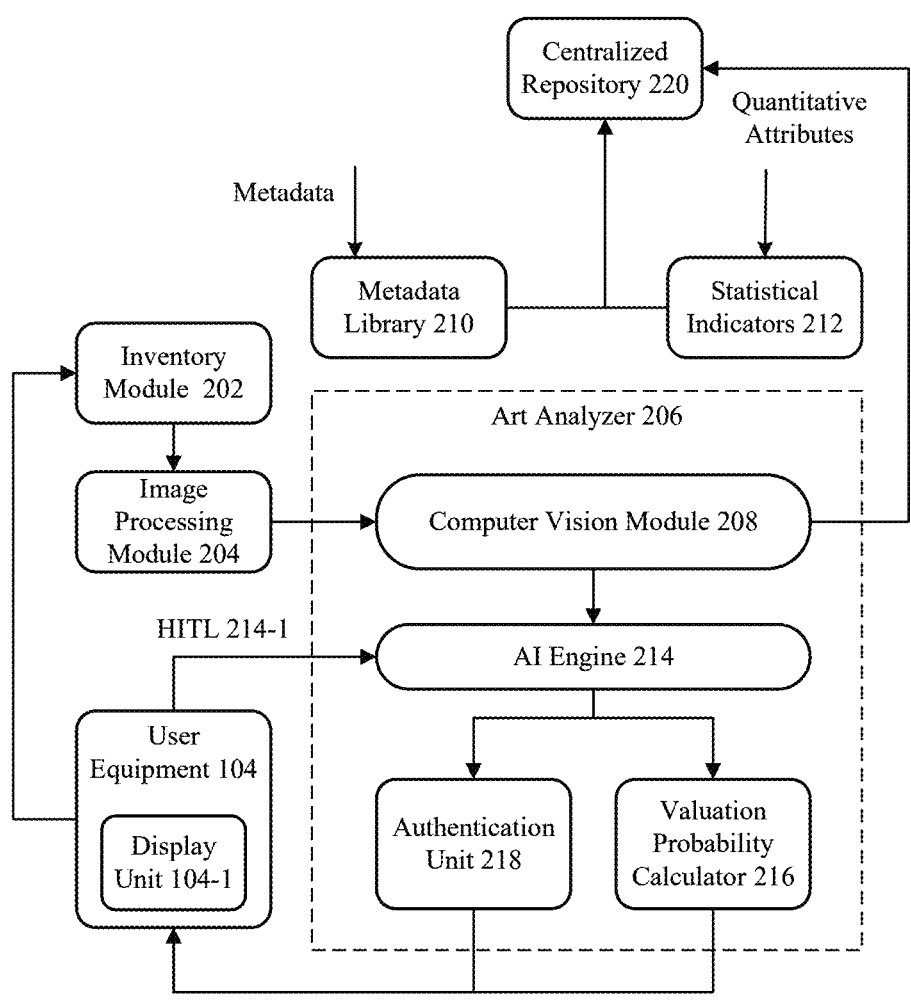
FIG. 2A illustrates a block diagram of the system for authenticating and determining probable valuation of the artwork, according to certain embodiments.

FIG. 2A illustrates a system-level data flow 200 for art authentication and valuation. The system 200 is configured to receive an image of an artwork, pre-process the image to enhance quality for analysis, analyze the pre-processed image to generate visual embeddings representing features of the artwork, combine the visual embeddings with contextual data obtained from a metadata library 210 and a statistical identifiers database 212, generate feature representations for authentication and valuation, generate an authentication output indicative of authenticity of the artwork, apply at least one probabilistic model to integrate the feature representations, the authentication output, and contextual market data, generate a probabilistic valuation of the artwork, and present the authentication output and the valuation output on a display unit 104-1 of a user equipment 104.

The user equipment 104 represents mobile devices, such as smartphones, which are configured to operate the mobile application. The user equipment 104 includes necessary hardware components, such as processing engines, microcontrollers, image capturing devices, and communication modules to support the applications functionalities. A user 102 of the system 108 may capture an image, such as photo of the painting, and upload the image in the system 108. The user 102 may receive a high resolution image from an external data source and upload the image at an inventory module 202 of the system 108. In another implementation, the user 102 may email the image to the system 108 using the user equipment 104.

The system 200 further comprises an inventory module 202 configured to receive an image of an artwork from a user equipment 104 and to store the image together with associated data for subsequent processing. As used herein, the term inventory module refers to a software-implemented or hardware-implemented component that provides an interface between the user equipment 104 and downstream modules of the system 200, such that images of artworks and related information are persistently stored, organized, and made accessible for analysis. In one embodiment, the inventory module 202 includes an upload interface configured to receive digital images captured by the user equipment 104, which may comprise a mobile computing device executing an art authentication and valuation application. The upload interface may support multiple file formats, including Joint Photographic Experts Group (JPEG), Portable Network Graphics (PNG), or Tagged Image File Format (TIFF), and may apply checksum or hashing algorithms to ensure image integrity at the time of ingestion.

The inventory module 202 is further configured to generate or associate metadata with the uploaded image, including, but not limited to, capture time, device identifier, geolocation, user identification, or user-supplied notes. In some embodiments, the inventory module 202 incorporates a structured database or a cloud-hosted object storage repository for persisting the images and metadata in a retrievable manner. For example, the inventory module 202 may be implemented using a relational database (e.g., MySQL or PostgreSQL) or a NoSQL store (e.g., MongoDB or Cassandra) for storing structured historical data about artists and their works, including catalog references, provenance annotations, or prior valuations. The inventory module 202 may further be configured to support categorization of artworks by artist, style, medium, or collection, thereby enabling efficient retrieval and comparison during authentication and valuation workflows.

In one illustrative configuration, the inventory module 202 supports synchronization with external repositories, such as museum catalogues, auction house databases, or gallery inventory management systems, to enrich the stored dataset with verified historical and contextual information. In another configuration, the inventory module 202 implements user-facing dashboards that allow collectors and gallerists to manage digital portfolios of artworks, upload new entries, and review prior authentication and valuation reports.

Once an image is stored in the inventory module 202, the image is transmitted to an image processing module 204 for pre-processing. In one embodiment, the transfer is performed through an application programming interface (API) call or a direct data pipeline, ensuring that the pre-processing stage receives a high-fidelity copy of the artwork image together with associated metadata tags. By maintaining the linkage between stored inventory records and the images passed downstream, the system 200 enables reproducibility of authentication and valuation results, traceability of data sources, and iterative model improvements through human-in-the-loop feedback.

The system 200 further comprises an image processing module 204 configured to pre-process the image to enhance quality for analysis. The image processing module 204 refers to a hardware-implemented or software-implemented component that applies digital image enhancement techniques to standardize and optimize artwork images prior to further analysis by the computer vision module 208 and the artificial intelligence engine 214. The image processing module 204 is operable to perform one or more image enhancement methods, including noise reduction, contrast equalization, artifact removal, background removal, or segmentation of features such as signatures, thereby generating a pre-processed image optimized for subsequent computer vision analysis.

In one embodiment, the noise reduction functionality of the image processing module 204 is implemented using filtering algorithms such as Gaussian blur, median filtering, or non-local means to reduce digital noise artifacts arising from image capture under suboptimal lighting conditions. In another embodiment, the image processing module 204 applies contrast equalization through histogram equalization or contrast-limited adaptive histogram equalization to ensure uniform brightness and contrast distribution across the image. The artifact removal functionality may target lens distortions, compression artifacts, or reflections, while background removal may be implemented through chroma-key segmentation, thresholding, or deep-learning-based semantic segmentation models to isolate the artwork from its surrounding environment.

In some configurations, the image processing module 204 is specifically configured to perform segmentation of features of interest within the artwork, such as artist signatures, recurring motifs, or distinct regions of brushwork. For example, a region-based convolutional neural network may be employed to detect and crop signature regions with pixel-level accuracy. These extracted regions can then be passed downstream as independent feature maps for statistical identifier analysis.

The image processing module 204 may be implemented as a dedicated image pre-processing pipeline running on the user equipment 104 prior to upload, as a cloud-hosted service that scales dynamically to handle large numbers of artwork images uploaded concurrently, or as a hybrid deployment in which coarse pre-processing occurs on the user equipment 104 and fine-grained segmentation is executed on a centralized server.

The image processing module 204 maintains interoperability with the inventory module 202, such that images stored and retrieved from the inventory are automatically directed to the pre-processing pipeline. The pre-processed image generated by the image processing module 204 is then transmitted to the computer vision module 208, which analyzes the enhanced and standardized image to extract brushstroke, texture, shape, and color-distribution features. The pre-processed image may also be associated with metadata and statistical identifiers in the centralized repository 220, enabling linkage between pre-processing parameters and final valuation outputs.

By providing standardized pre-processed images to the computer vision module 208 and the artificial intelligence engine 214, the image processing module 204 ensures reproducibility of authentication and valuation outcomes across varied input conditions. In some examples, the image processing module 204 further generates logs of pre-processing parameters, including filter coefficients, segmentation masks, and contrast adjustments, which may be referenced in explainable AI reports presented to the user on the display unit 104-1. The display unit 104-1 may be embodied in different forms, including, but not limited to, a touchscreen interface of a mobile computing device such as a smartphone or tablet, a desktop or laptop computer monitor, a kiosk-based interactive display deployed in galleries or auction houses, or a head-mounted augmented reality or virtual reality device configured to render authentication and valuation outputs in immersive formats. In each case, the display unit 104-1 is configured to present authentication results, valuation probabilities, anomaly detections, and explainable AI reports in a user-accessible manner, thereby enabling informed decision-making by investors, collectors, and gallerists.

The system 200 further comprises a computer vision module 208 configured to analyze the pre-processed image and to generate visual embeddings representing features of the artwork. The term computer vision module, as used herein, refers to a component implemented in hardware, software, or a combination thereof that applies image analysis and machine learning techniques to transform a digital image into structured numerical representations. The computer vision module 208 operates downstream of the image processing module 204 and upstream of the artificial intelligence engine 214, such that images enhanced by the image processing module 204 are provided directly to the computer vision module 208, and embeddings produced by the computer vision module 208 are transmitted to the artificial intelligence engine 214 for subsequent multimodal fusion.

The computer vision module 208 is configured to identify and encode both low-level and high-level visual features present in an artwork. Low-level features include characteristics such as brushstroke orientation, color gradients, and texture distributions, while high-level features include compositional structure, stylistic patterns, and recurring motifs. The module transforms these features into visual embeddings, which are numerical vectors that capture the stylistic, structural, and compositional attributes of the artwork in a standardized format. The embeddings serve as quantitative inputs to downstream components, ensuring that visual information is harmonized with contextual data derived from the metadata library 210 and the statistical identifiers database 212.

In one embodiment, the computer vision module 208 applies predictive models selected from machine learning families including convolutional neural networks, generative adversarial networks, recurrent neural networks, and transformer-based models. These predictive models may be employed individually or in combination to enhance recognition of stylistic authenticity, to distinguish genuine works from forgeries, and to detect relationships between visual characteristics across artworks. The computer vision module 208 may further employ probabilistic methods or attention-based mechanisms to enrich the embeddings with contextual dependencies present across different regions of an image.

The embeddings generated by the computer vision module 208 are provided to the artificial intelligence engine 214, where they are combined with contextual information including metadata and statistical identifiers. Thus, the raw visual information is expressed in a structured form that is suitable for integration with non-visual data sources, enabling authentication and valuation analyses that are both robust and explainable. In one configuration, the computer vision module 208 communicates directly with the artificial intelligence engine 214 through a data interface or application programming interface, while in another configuration the computer vision module 208 stores embeddings in the centralized repository 220 for retrieval by the artificial intelligence engine 214 at a later stage.

In exemplary deployments, the computer vision module 208 may be instantiated as a cloud-hosted analysis service, a dedicated server-side component integrated with the valuation platform, or an embedded library executing on the user equipment 104. In each configuration, the computer vision module 208 ensures that images supplied by the image processing module 204 are transformed into visual embeddings and supplied to the artificial intelligence engine 214 as inputs for authentication and valuation.

The system 200 further comprises a metadata library 210 and a statistical identifiers database 212, which collectively provide contextual and historical information for use by the artificial intelligence engine 214 in authentication and valuation tasks.

The metadata library 210 comprises subject matter identifiers curated by one or more subject matter experts. These identifiers may include thematic classifications such as religious, mythological, or abstract themes, notable figures or muses associated with a particular artist, recurring motifs such as flowers, landscapes, or self-portraits, and style periods corresponding to recognized phases in an artist's career, such as Impressionist, Cubist, or Blue Period works. The metadata library 210 may further store exhibition histories, including dates, venues, and catalog numbers, as well as catalog references linking an artwork to published catalogues raisonnés. Provenance annotations, which trace the chain of ownership of a work, and expert-curated stylistic features, such as characteristic palette usage, brushstroke techniques, or compositional tendencies, may also be recorded in the metadata library 210. In some embodiments, the metadata library 210 may be implemented as a relational database, a knowledge graph, or a document store capable of linking artworks, artists, exhibitions, and stylistic movements.

The statistical identifiers database 212 comprises quantitative artwork-level attributes, including at least artist identification codes, signature presence and location, artwork size, medium of execution, and condition indicators. In addition, the statistical identifiers database 212 stores provenance records in standardized formats, as well as transactional and market data such as historical sales records, auction house results, and private sales data. The database 212 further maintains scarcity indicators, including edition sizes for prints or the number of comparable works produced in a given series, and baseline price metrics derived from statistical analyses of past market activity, such as mean, median, and standard deviation of sales prices. The statistical identifiers database 212 may be implemented as a structured query language database, a distributed ledger, or a hybrid storage system that enables both time-series analysis of auction results and cross-sectional comparison across artists and genres.

In some embodiments, the metadata library 210 and the statistical identifiers database 212 are stored within a centralized repository 220 accessible by the artificial intelligence engine 214. The centralized repository 220 may be maintained on a cloud-based storage architecture or an enterprise database cluster and is continuously updated with new artist information, catalog entries, provenance discoveries, auction results, and private sales records. The centralized repository 220 ensures consistency of data across system modules and enables reproducibility of authentication and valuation outcomes.

In operation, the artificial intelligence engine 214 retrieves qualitative descriptors from the metadata library 210 and quantitative attributes from the statistical identifiers database 212 and combines these contextual data inputs with visual embeddings generated by the computer vision module 208. The integration of metadata and statistical identifiers ensures that visual analysis is augmented by historical, thematic, and transactional information, thereby enabling probabilistic modeling in the valuation probability calculator 216 to account for both artistic authenticity and market dynamics. The interconnection between the metadata library 210, the statistical identifiers database 212, and the artificial intelligence engine 214 thus provides a multimodal foundation for explainable authentication and valuation outputs presented to the user equipment 104.

The system 200 further comprises an AI engine 214 configured to combine the visual embeddings received from the computer vision module 208 with contextual data obtained from the metadata library 210 and the statistical identifiers database 212, and to generate feature representations for authentication and valuation. As used herein, the term AI engine refers to a multimodal inference framework implemented in hardware, software, or a combination thereof, designed to process and integrate heterogeneous input signals, including visual, textual, and numerical data, into standardized feature representations. The AI engine 214 operates downstream of the computer vision module 208 and the metadata and statistical repositories, and upstream of the authentication unit 218 and the valuation probability calculator 216, thereby serving as a central integrative component within the system 200.

The AI engine 214 comprises a feature integration module configured to ingest visual embeddings generated by the computer vision module 208 and metadata embeddings derived from the metadata library 210. In one example, metadata embeddings may represent categorical identifiers such as style period or thematic classification in vectorized form, enabling direct mathematical integration with visual embeddings. The feature integration module ensures that image-based and non-image-based representations are normalized into a unified feature space suitable for subsequent fusion and probabilistic modeling.

The AI engine 214 further comprises a multimodal fusion module configured to combine the embeddings with contextual data including statistical identifiers, historical sales records, and sentiment indicators. In one embodiment, the multimodal fusion module employs attention-based mechanisms to weight the relative importance of inputs, for example assigning higher influence to provenance or sales history when such data is complete, and higher influence to stylistic embeddings when historical data is sparse. In another embodiment, the multimodal fusion module incorporates probabilistic graphical models or transformer-based fusion networks to capture interdependencies among visual features, market conditions, and social sentiment.

The AI engine 214 additionally includes an output module configured to generate explainable AI results. In some implementations, the output module produces attribution maps that highlight portions of the artwork image most influential to the authentication decision or tabular explanations indicating the contribution of specific sales records or scarcity indicators to the valuation outcome. These outputs enable users to interpret how the system 200 arrived at a decision, thereby improving transparency and trust in the authentication and valuation process.

The AI engine 214 further comprises a continuous learning logic configured to update predictive models using human-in-the-loop (HITL) feedback. FIG. 2A depicts HITL 214-1 operatively coupled to the AI engine 214, indicating that uncertain cases are flagged for expert annotation. For example, if the AI engine 214 produces a low-confidence authentication output for an image, the system 200 may forward the case to a human expert, whose annotation is incorporated into the training set. The continuous learning logic then retrains or fine-tunes predictive models to incorporate the new data, thereby improving performance over time and adapting to evolving market conditions.

The AI engine 214 provides the generated feature representations in parallel to an authentication unit 218 and a valuation probability calculator 216. The authentication unit 218 is configured to analyze the feature representations produced by the AI engine 214 and to generate an authentication output indicative of the authenticity of the artwork. The authentication output may indicate whether the artwork corresponds to a claimed artist, style, or period, and may include a confidence score. The authentication output is transmitted both to the valuation probability calculator 216 for incorporation into valuation modeling and to the user equipment 104 for presentation on the display unit 104-1.

The valuation probability calculator 216 integrates the authentication output with feature representations and contextual data to produce a probabilistic valuation, which is also presented on the user equipment 104. The interconnection between the AI engine 214, the authentication unit 218, the valuation probability calculator 216, and the user equipment 104 ensures that both authenticity assessments and market valuations are generated in a coordinated and explainable manner.

In exemplary configurations, the AI engine 214 may be implemented as a server-based inference engine operating on dedicated GPU or TPU clusters, as a cloud-native service supporting elastic scaling for high-throughput valuation requests, or as a hybrid framework in which lightweight model inference occurs locally on user equipment 104 and full multimodal fusion and retraining occur in the centralized repository 220. The modular design of the AI engine 214 allows the system 200 to adapt to varying deployment environments while maintaining functional interconnection with the computer vision module 208, the metadata library 210, the statistical identifiers database 212, the authentication unit 218, and the valuation probability calculator 216.

The system 200 further comprises a valuation probability calculator 216 configured to generate a valuation output indicating a probable change in the valuation of the artwork. As used herein, the term valuation probability calculator refers to a computational component implemented in hardware, software, or a combination thereof that integrates multimodal features, authentication results, and market information to produce probabilistic estimates of artwork valuation. The valuation probability calculator 216 operates downstream of the AI engine 214 and the authentication unit 218, such that feature representations generated by the AI engine 214 and authentication outputs generated by the authentication unit 218 are combined with contextual market data to generate valuation results.

The valuation probability calculator 216 comprises a probabilistic modeling unit configured to apply at least one of a Bayesian network or another probabilistic model to integrate the feature representations, the authentication output, and contextual market data. In one embodiment, the Bayesian network comprises a graphical model in which nodes represent valuation factors, such as artist reputation, artwork scarcity, historical sales trajectory, sentiment indices, and authenticity confidence, and edges represent conditional dependencies among these factors. In another embodiment, the probabilistic modeling unit employs alternative probabilistic methods, such as hidden Markov models, probabilistic graphical models, or ensemble models, to account for uncertainty and interdependency across features. The probabilistic modeling unit calculates a valuation probability that indicates the likelihood of an increase or decrease in the artwork's value over a defined temporal horizon, such as six months, one year, or five years, depending on market dynamics.

The valuation probability calculator 216 further comprises an anomaly detection unit configured to compare the calculated valuation probability with current market prices to identify deviations and to determine explanatory factors influencing the valuation. In one example, the anomaly detection unit flags cases where an artwork is listed significantly below the predicted valuation probability, indicating a potential undervaluation opportunity for investors. In another example, the anomaly detection unit detects artworks priced significantly above expected valuation trajectories, highlighting potential overvaluation or speculative risk. The anomaly detection unit may further generate factor-level explanations, such as attribution of deviations to recent shifts in auction results, scarcity indicators, or sentiment variations.

The valuation output generated by the valuation probability calculator 216 comprises both probabilistic values and explainable AI results. In some embodiments, the valuation output includes confidence intervals, graphical representations of valuation probability distributions, and textual explanations summarizing the relative weight of different contributing factors. The valuation output may also incorporate anomaly indications that highlight disparities between predicted and observed prices.

The valuation output is provided to the user equipment 104 for presentation on the display unit 104-1. The display unit 104-1 may include, for example, the touchscreen of a smartphone, a tablet interface, a laptop or desktop monitor, or a specialized gallery kiosk configured to present authentication results and valuation probabilities in an interactive format. The display unit 104-1 is further configured to render detailed reports containing valuation trajectories, anomaly detections, and explanatory factors, thereby enabling investors, collectors, and gallerists to interpret and act on the valuation insights.

In exemplary configurations, the valuation probability calculator 216 is implemented as a server-based probabilistic inference service, as a cloud-native module integrated into the centralized repository 220, or as an embedded component within the AI engine 214. In one configuration, the calculator 216 processes requests in batch mode for portfolio-level analyses, while in another configuration it operates in real time to deliver valuation predictions for individual artworks captured by the user equipment 104. The interconnection between the valuation probability calculator 216, the AI engine 214, the authentication unit 218, the metadata library 210, and the statistical identifiers database 212 ensures that probabilistic valuation outputs are based on both visual and contextual evidence, thereby strengthening the robustness and transparency of authentication and valuation determinations produced by the system 200.

In some embodiments, the system 200 further comprises a knowledge graph generation logic configured to represent artists, artworks, and genres as nodes and similarities or influences as edges, the knowledge graph being provided as an input to the valuation probability calculator 216. The knowledge graph thereby augments the contextual data used by the probabilistic modeling unit to refine valuation outputs.

In operation, the inventory module 202 receives the image from the user equipment 104 and provides it to the image processing module 204. The image processing module 204 outputs the pre-processed image to the computer vision module 208, which generates visual embeddings. The AI engine 214 retrieves contextual data from the metadata library 210 and the statistical identifiers database 212 stored in the centralized repository 220, combines the embeddings and contextual data, and produces feature representations for authentication and valuation. The authentication unit 218 consumes the feature representations to generate the authentication output. The valuation probability calculator 216 integrates the feature representations, the authentication output, and contextual data, applies probabilistic modeling, and generates the valuation output. Both the authentication output and the valuation output are presented on the display unit 104-1 of the user equipment 104.

Figure 2B:
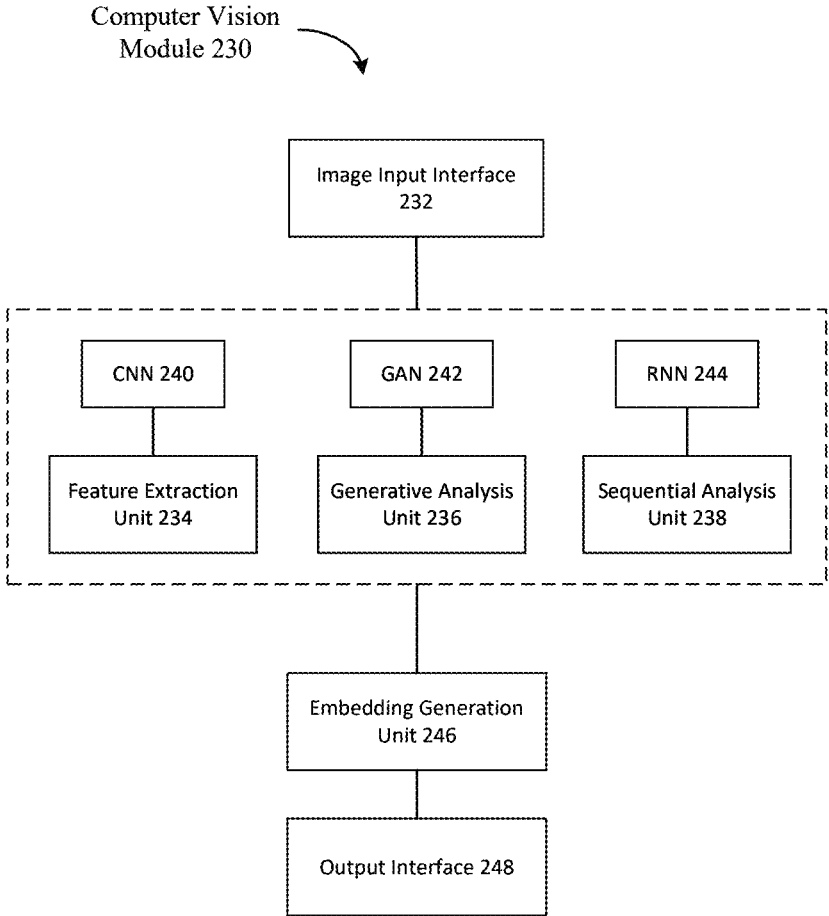
FIG. 2B illustrates a computer vision module for extracting and embedding visual features of an artwork, according to certain embodiments.

FIG. 2B illustrates a computer vision module 230, according to certain embodiments of the present disclosure. The computer vision module 230 is configured to analyze pre-processed images of artworks and to generate visual embeddings representing features of the artwork, which are subsequently utilized for authentication and valuation processes.

The computer vision module 230 comprises an image input interface 232. The term image input interface, as used herein, refers to a hardware or software implemented interface configured to receive a pre-processed image of an artwork from the image processing module 204. In one embodiment, the image input interface 232 is embodied as an application programming interface (API) that transfers image data in real time between the image processing module 204 and the computer vision module 230. In another embodiment, the image input interface 232 may be implemented as a graphical pipeline supporting multiple file formats including Joint Photographic Experts Group (JPEG), Portable Network Graphics (PNG), or Tagged Image File Format (TIFF). The image input interface 232 ensures that the incoming image is standardized in terms of resolution, aspect ratio, and color profile for subsequent analysis. For example, the interface may normalize the image into a fixed resolution (e.g., 512×512 pixels) while preserving detail in brushstrokes and color gradients.

The computer vision module 230 further comprises a feature extraction unit 234 operatively connected to the image input interface 232. The feature extraction unit 234 is configured to apply convolutional neural networks (CNNs) 240 for extracting both low-level and high-level visual features. Low-level features include brushstroke orientation, edge contours, micro-textures, and pixel-level color distributions. High-level features include compositional layout, subject matter, and distinctive stylistic patterns unique to an artist or movement. In one embodiment, the feature extraction unit 234 employs deep CNN architectures such as ResNet, VGGNet, or EfficientNet trained on diverse art datasets, enabling robust identification of artistic styles. For example, the CNNs may detect short, repetitive strokes in the style of Vincent van Gogh or geometric cubist shapes in works of Pablo Picasso. In another embodiment, specialized CNN layers are used to extract frequency-based texture patterns, capturing nuanced artistic details that are often overlooked in traditional analysis.

The computer vision module 230 further comprises a generative analysis unit 236, which is operatively coupled to the feature extraction unit 234. The generative analysis unit 236 employs generative adversarial networks (GANs) 242 to distinguish between authentic and forged stylistic elements. The GANs function by training a generator to produce synthetic artworks and a discriminator to evaluate their authenticity relative to genuine samples. This adversarial training process allows the generative analysis unit 236 to capture subtle stylistic variations, such as inconsistencies in layering, brushstroke flow, or pigment saturation, that may differentiate authentic artworks from forgeries. In one example, the GAN-based unit is trained on thousands of authentic works of an artist to identify stylistic signatures; during analysis, it may detect forged attempts where brushstroke cadence deviates from the original artist's technique. The generative analysis unit 236 may be configured to implement architectures such as CycleGAN or StyleGAN to perform domain adaptation between authentic and forged artwork spaces.

The computer vision module 230 further comprises a sequential analysis unit 238 operatively connected to the generative analysis unit 236. The sequential analysis unit 238 is configured to employ recurrent neural networks (RNNs) 244 or transformer-based models to identify temporal, stylistic, or contextual sequences across related artworks. The sequential analysis unit 238 captures dependencies and progressions in artistic evolution. In one embodiment, the RNNs, such as Long Short-Term Memory (LSTM) networks or Gated Recurrent Units (GRUs), are employed to model stylistic progressions across multiple works of an artist over time. For example, the system may detect transitions between Pablo Picasso's Blue Period and Cubist Period by analyzing temporal changes in color palettes and compositional structures. In another embodiment, transformer-based models, such as Vision Transformers (ViT) or DETR, are utilized to capture long-range dependencies within a single artwork, allowing the system to analyze relationships between distinct regions of an image, such as background motifs and central subjects.

The outputs from the feature extraction unit 234, the generative analysis unit 236, and the sequential analysis unit 238 are transmitted to an embedding generation unit 246. The embedding generation unit 246 is configured to transform extracted features into numerical embeddings that represent stylistic, structural, and compositional characteristics of the artwork. The embeddings are structured as dense numerical vectors, enabling downstream modules to perform quantitative comparisons between artworks. In one embodiment, the embedding generation unit 246 applies dimensionality reduction techniques such as Principal Component Analysis (PCA) or autoencoders to compress high-dimensional feature maps into compact representations while preserving essential information. For example, embeddings generated may capture the textural fingerprint of an artist's brushstrokes, stylistic tendencies in composition, and palette distribution, all encoded into numerical form. These embeddings serve as a robust input for the artificial intelligence engine 214 for authentication and valuation.

The computer vision module 230 further comprises an output interface 248 operatively connected to the embedding generation unit 246. The output interface 248 is configured to provide embeddings generated by the embedding generation unit 246 to the artificial intelligence engine 214. In one embodiment, the output interface 248 is implemented as an API for real-time data transfer. In another embodiment, the output interface 248 writes embeddings into a centralized repository 220 for retrieval by the AI engine 214. The output interface 248 ensures interoperability with downstream modules by formatting embeddings into standardized vector spaces compatible with multimodal fusion processes.

Through the integration of the image input interface 232, the feature extraction unit 234, the generative analysis unit 236, the sequential analysis unit 238, the embedding generation unit 246, and the output interface 248, the computer vision module 230 provides a comprehensive framework for analyzing visual features of artworks. By combining convolutional, generative, and sequential modeling techniques, the computer vision module 230 delivers robust embeddings that enhance the reliability and explainability of downstream authentication and valuation analyses.

Figure 2C:
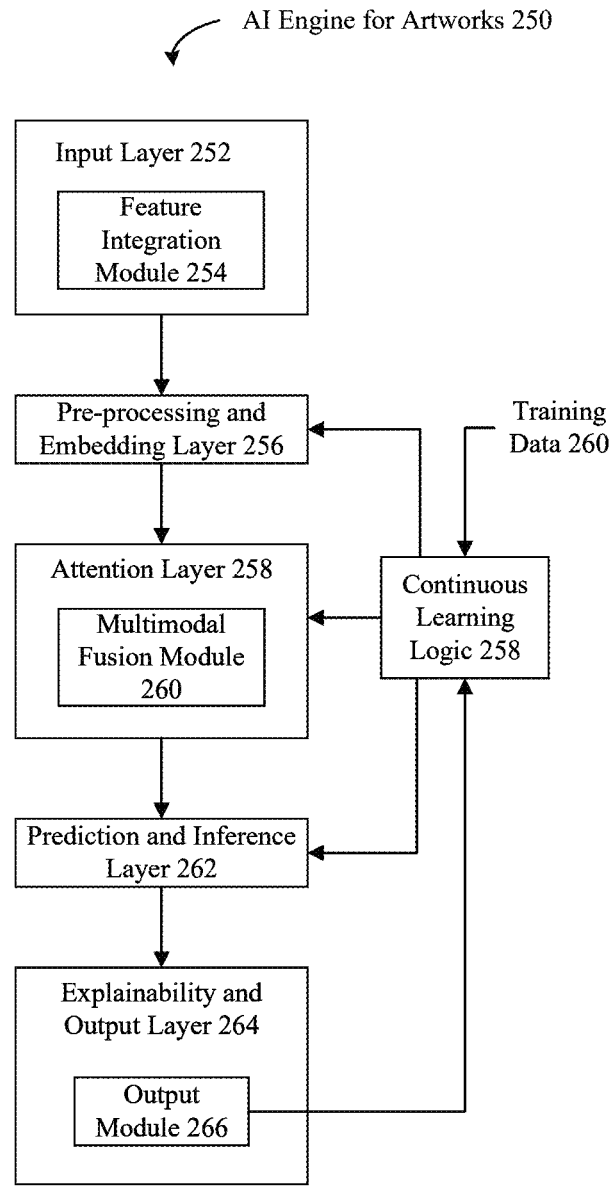
FIG. 2C illustrates an artificial intelligence engine for multimodal integration, explainability, and continuous learning in art authentication and valuation, according to certain embodiments.

FIG. 2C illustrates an artificial intelligence engine 250 for artworks, according to certain embodiments of the present disclosure. The artificial intelligence engine 250 is configured to integrate multimodal features, generate feature representations for authentication and valuation, and refine predictive performance through continuous learning updates.

The artificial intelligence engine 250 comprises an input layer 252 configured to receive multimodal inputs, including visual embeddings from the computer vision module 208, metadata embeddings from the metadata library 210, and statistical data vectors from the statistical identifiers database 212. The input layer 252 aligns formats and numerical scales across heterogeneous features so that stylistic embeddings (e.g., brushstrokes), contextual metadata (e.g., style period), and statistical indicators (e.g., median sales price) are normalized for downstream processing.

A feature integration module 254 is operatively coupled to the input layer 252 to harmonize heterogeneous inputs. The module 254 applies embedding concatenation, normalization, and alignment to create a joint representation space accommodating both visual indicators such as brushstroke frequency and contextual attributes such as provenance or scarcity.

The engine 250 further includes a pre-processing and embedding layer 256 that transforms incoming features into compact embeddings optimized for model ingestion. Dimensionality reduction methods such as principal component analysis or autoencoders compress high-dimensional feature maps into latent vectors. For visual data, convolutional neural networks detect edges, textures, shapes, and stylistic attributes, while for textual metadata, natural language processing techniques such as word embeddings (Word2Vec, GloVe) or contextual embeddings (BERT) convert descriptive entries into semantic vectors.

An attention layer 258 applies self-attention mechanisms to dynamically weight the relative importance of features. For example, when provenance data is incomplete, greater weight is assigned to visual embeddings; when historical market records are rich, contextual identifiers may dominate.

The multimodal fusion module 260 is coupled to the attention layer 258 and combines embeddings from visual, metadata, and statistical domains into a fused representation. In some embodiments, the module 260 employs transformer-based architectures with multi-headed attention to capture cross-dependencies; in others, Bayesian probabilistic modeling is applied to represent conditional relationships, such as the dependency of valuation probability on both authenticity confidence and recent market trajectories.

Training data supplied to the fusion module enables calibration of feature weights across domains.

Downstream, a prediction and inference layer 262 processes fused feature representations to generate outputs for authentication and valuation. This layer may incorporate convolutional neural networks for visual pattern recognition, recurrent neural networks such as LSTM or GRU for temporal market trend analysis, and transformer-based layers for global context. Generative adversarial networks may be used during training to augment datasets with synthetic artworks, improving robustness against forgery detection.

The engine 250 further comprises an explainability and output layer 264, which generates explainable AI results. Outputs include attribution maps identifying influential image regions, factor-level weight tables for provenance or scarcity indicators, and graphical visualizations of contribution ratios. The output module 266 formats these results and delivers them to the authentication unit 218, the valuation probability calculator 216, and the display unit 104-1 of the user equipment 104.

Continuous learning logic 268, operatively connected to a human-in-the-loop (HITL) interface 214-1, monitors prediction confidence, flags ambiguous cases, and routes them for expert annotation. Expert feedback is incorporated into the centralized repository 220 and used for retraining, while new auction records, private sales, and sentiment data are continuously ingested to update predictive models.

The training pipeline of the artificial intelligence engine 250 includes data collection from museums, galleries, auction houses, and private collections; pre-processing for consistency in dimensions, orientation, and colour profile; embedding generation for visual and textual information; supervised learning using gradient descent algorithms such as stochastic gradient descent, Adam, or RMSprop; and validation with accuracy, precision, recall, and F1 score. Data augmentation using GANs expands training diversity, while dropout and regularization prevent overfitting.

Figure 2D:
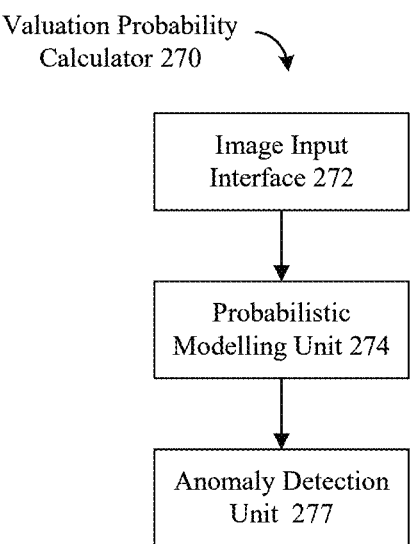
FIG. 2D illustrates a valuation probability calculator for generating probabilistic valuations and anomaly detections of artworks, according to certain embodiments.

FIG. 2D illustrates a valuation probability calculator 270 of the system 200 for art authentication and valuation, according to certain embodiments of the present disclosure. The valuation probability calculator 270 is configured to generate a valuation output indicating a probable change in the valuation of the artwork. The calculator 270 integrates feature representations, authentication outputs, and contextual market data, and provides the valuation output for presentation on a display unit 104-1 of a user equipment 104.

The valuation probability calculator 270 comprises an image input interface 272 configured to receive multimodal embeddings, including visual embeddings generated by the computer vision module 208, metadata embeddings from the metadata library 210, statistical attributes from the statistical identifiers database 212, and authentication results from the authentication unit 218. The image input interface 272 normalizes heterogeneous inputs into aligned formats so that stylistic brushstroke distributions, metadata descriptors such as an artist's stylistic period, and statistical indicators such as average realized auction prices are represented in compatible data structures.

The valuation probability calculator 270 further comprises a probabilistic modelling unit 274 configured to apply at least one probabilistic model to integrate feature representations, the authentication output, and contextual market data. In one embodiment, the probabilistic modelling unit 274 employs a Bayesian network in which nodes represent valuation factors such as authenticity confidence, artist reputation, provenance history, market sentiment, and scarcity, while edges encode conditional dependencies. The Bayesian network outputs a valuation probability quantifying the likelihood of an increase or decrease in value over a defined time horizon. In other embodiments, the probabilistic modelling unit 274 employs hidden Markov models to capture temporal market transitions, or ensemble models combining decision trees, random forests, and boosting algorithms to improve predictive accuracy.

The valuation probability calculator 270 further comprises an anomaly detection unit 277 configured to compare the calculated valuation probability with observed market prices to identify deviations. In one example, if the calculated probability indicates a likely increase in value but the artwork is currently listed below historical averages, the anomaly detection unit 277 flags the case as potentially undervalued. In another example, where an artwork is priced significantly above predicted probabilities, the anomaly detection unit 277 identifies speculative overvaluation. The anomaly detection unit 277 may also identify explanatory factors such as spikes in social sentiment, atypical auction results, or incomplete provenance data, and communicate these through structured reports.

The valuation probability calculator 270 generates outputs comprising probabilistic values, anomaly detections, and explainable AI results. In one embodiment, the valuation output includes a confidence interval around the predicted valuation trajectory, a graphical distribution of probability outcomes, and an attribution map highlighting the features most influential to the result, such as provenance confidence, scarcity indicators, or stylistic embeddings. In another embodiment, the valuation output includes visual charts comparing predicted valuation probabilities against historical sales trajectories, accompanied by narrative explanations for deviations.

The valuation probability calculator 270 interfaces with the display unit 104-1 to present outputs to the user equipment 104. The display unit 104-1 may be embodied as a touchscreen smartphone, a tablet, a desktop or laptop monitor, or a kiosk installed at a gallery or auction house. In some configurations, the display unit 104-1 supports interactive overlays enabling the user to explore factor contributions, toggle between historical and predictive valuation views, or review anomaly reports in real time.

In exemplary deployments, the valuation probability calculator 270 may be implemented as a cloud-based probabilistic inference service integrated with the centralized repository 220, as an embedded inference module on the user equipment 104 for on-device valuation, or as a hybrid framework. In batch configurations, the calculator 270 processes portfolio-level datasets for institutional investors, whereas in real-time configurations it provides immediate valuations for individual artworks uploaded via the inventory module 202.

Figure 3:
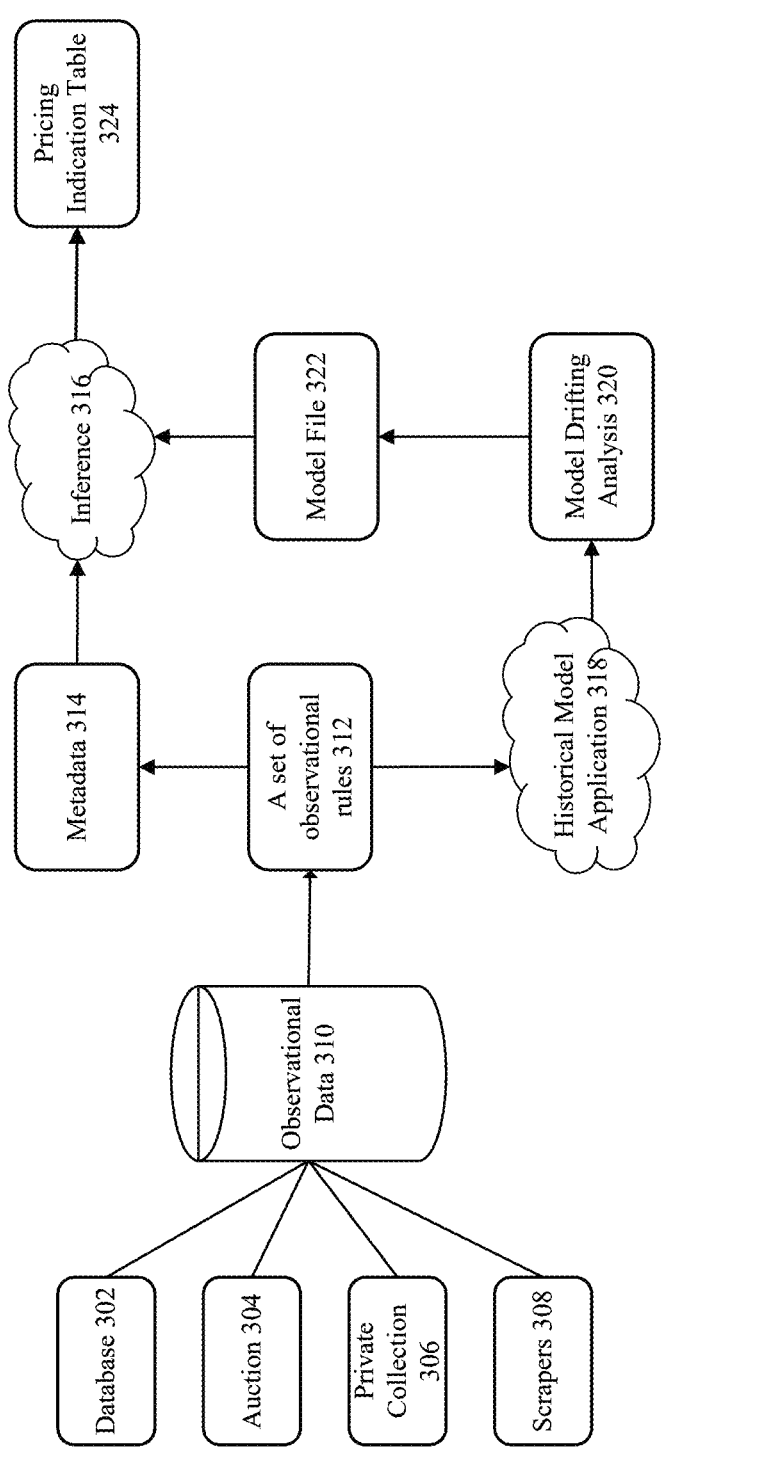
FIG. 3 illustrates an exemplary system architecture for art analysis and valuation, according to certain embodiments.

FIG. 3 illustrates an exemplary system architecture 300 for art analysis and valuation, in accordance with embodiments of the present disclosure. The system architecture 300 shows several modules and data sources, each contributing to the overall functionality of the art valuation process.

The system 108 includes a database 302, which serves as the central repository where all relevant data is stored. The database 302 can store data in various formats, including relational databases (e.g., SQL), NoSQL databases (e.g., MongoDB), and file-based storage (e.g., JSON, CSV). The database 302 includes historical sales data, artist information, and other metadata required for analysing and valuing artwork. For example, the database may contain sales records from various auction houses, private collections, and online art marketplaces, structured in tables that relate artists to their works, sale prices, and dates of sale.

The system 108 further includes an auction module 304. The auction module 304 interacts with various auction houses to gather data on past and upcoming auctions. It provides crucial information about the sale prices of similar artworks, which helps in determining the valuation of new pieces. For instance, the auction module can track the sales of Picasso's artworks across different auction platforms to establish a benchmark for pricing. The module may use APIs provided by auction houses or web scraping techniques to collect this data.

Additionally, the system 108 comprises a private collection module 306. This module gathers data from private art collections, which is valuable for understanding market trends and the scarcity of particular artworks. An example is collecting details from private collectors who own rare pieces by renowned artists, thus contributing to the artwork's overall market valuation. The module may include secure data transfer protocols to protect the privacy of private collectors.

The system 108 also includes scrapers 308, which are automated tools that collect data from various online sources, including social media, auction websites, and art dealer platforms. This data includes trends, sale prices, and other relevant metrics. For example, scrapers 308 can analyse social media platforms for trending artists or artworks, providing real-time data on market popularity. The scrapers 308 may use techniques such as HTML parsing, API integration, and natural language processing (NLP) to extract and interpret data from these sources. The data collected by scrapers 308 is then normalized.

Furthermore, the system 108 includes an observational database 310 configured to store observational data received from the database 302, auction module 304, private collection module 306, and scrapers 308. The observational database 310 stored data collected through direct observation of artworks and market conditions. The data includes information on the condition of the artwork, public perception, and other qualitative aspects. For instance, observational data might capture the physical condition of a painting, noting any restorations or damage. Observational data can be gathered using sensors, cameras, and manual inspection by experts.

The system 108 includes a set of observational rules 312. The observational rules 312 are applied to the observational data to standardize the analysis process. They include criteria such as:

Social media trends: Analysis of how frequently an artwork or artist is mentioned across various social media platforms, identifying spikes in popularity.

Historical sales: Comparing the current state of the market with historical sales data to detect patterns and predict future trends.

Private sales: Incorporating data from private sales to provide a comprehensive view of the market value of the artwork.

Style of artwork: Evaluating the style of the artwork (e.g., impressionist, modern, abstract) and its impact on market demand.

Unique artist market situation: Considering specific factors like an artist's death, which often leads to a surge in value of their works.

Scarcity: Assessing the availability of similar works in the market, with rarer works typically having higher value.

Uniqueness of the artwork: Considering features that make the artwork unique, such as the use of rare materials, unique techniques, or notable provenance.

For example, a rule might state that if an artist has passed away recently, the system should expect an increase in the value of their works due to heightened market interest and reduced supply.

The criteria for analysing the value of an artwork include several important factors. Social media trends involve the analysis of how frequently an artwork or artist is mentioned across various social media platforms, identifying spikes in popularity. For instance, an artwork that suddenly gains attention on platforms like Instagram or Twitter may see a significant increase in its perceived value. Historical sales compare the current state of the market with historical sales data to detect patterns and predict future trends. This helps in understanding how similar artworks have performed over time, providing a baseline for valuation.

Private sales incorporate data from private sales to provide a comprehensive view of the market value of the artwork. This data can reveal insights into the exclusivity and demand for particular artworks that may not be publicly available. The style of artwork, such as whether it is impressionist, modern, or abstract, also plays a crucial role in determining its market demand. Certain styles may be more popular during specific periods, influencing the artwork's value.

The unique artist market situation considers specific factors like an artist's death, which often leads to a surge in the value of their works. For example, if an artwork is painted within less than three years since the artist's death, it may be perceived as one of the last works by the artist, thereby increasing its value. Conversely, if it is more than three years since the artist's death, the market might have stabilized, and the value might not see the same sharp increase.

Scarcity assesses the availability of similar works in the market, with rarer works typically having higher value. An artwork that is one of a kind or part of a limited series can command a higher price due to its scarcity. Uniqueness of the artwork considers features that make the artwork unique, such as the use of rare materials, unique techniques, or notable provenance. For instance, an artwork that uses a rare pigment or a unique technique that the artist was known for can significantly increase its value.

Consider an example of a painting created by an artist who passed away less than three years ago. If the artist was already famous at the time of their death, the painting's value might skyrocket due to the high demand and limited supply of the artist's works. Social media trends may further boost its popularity if the artist had a significant following, leading to higher visibility and interest in the artwork.

On the other hand, if the artist was emerging and gained fame posthumously, the painting might still see an increase in value, but the factors driving this increase would be different. Historical sales data might show a rising trend in the artist's work, and the uniqueness of the artwork, such as being part of the artist's early and innovative phase, might appeal to collectors and art enthusiasts looking to invest in promising talents.

In both scenarios, the combination of social media trends, historical sales, private sales data, style, unique market situation, scarcity, and uniqueness of the artwork provide a comprehensive analysis to determine market value of the artwork accurately.

The system 108 also includes metadata 314, which is a collection of structured information about the artworks, including artist details, creation date, medium, dimensions, and provenance. For example, metadata for a painting might include the artist's name, the year it was painted, its dimensions, and its ownership history. Metadata can be stored in formats like XML, RDF, or JSON-LD to ensure interoperability with other systems and standards in the art industry.

Historical model application 318 is another critical module within the system architecture 300. This module applies historical data models to the current dataset to predict future trends and valuations based on past performance. For instance, it can use historical sales data of impressionist paintings to forecast the future market value of a newly discovered impressionist artwork. The module may use statistical models, such as time series analysis, regression models, and machine learning algorithms, to identify patterns and make predictions.

The system 108 also includes model drifting analysis 320 and a model file 322. These analyses are used to ensure that the predictive models remain accurate over time and the model file 322 is fed to an inference module 316. The model drifting analysis 320 analyses any changes in the market that may affect the model's predictions. For example, if the market suddenly shifts towards contemporary art, the model drifting analysis will adjust the valuation models accordingly. Techniques, such as continuous learning, feedback loops, and model retraining are used to keep the models up-to-date.

The system 108 includes the inference module 316. The inference module 316 processes the data and observational rules to infer the current market value of the artwork. For instance, it might use data from recent sales, artist reputation, and current market trends to estimate the value of a painting by a contemporary artist. The inference module 316 may use a combination of rule-based reasoning, machine learning models, and expert systems to provide accurate valuations.

Lastly, the system 108 includes a pricing indication table 324. This table provides a summarized indication of the artwork's valuation based on the analysis performed by the system. It includes probable price ranges and valuation trends. For example, the table might indicate that a specific painting has an estimated market value between $50,000 and $70,000, with a trend suggesting a 10% annual increase. The pricing indication table is generated using data visualization techniques and may be presented in various formats such as graphs, charts, and summary reports.

The system architecture 300 allows for a robust and comprehensive analysis of artworks, leveraging a combination of historical data, real-time market trends, and expert rules to provide accurate valuation predictions. By integrating advanced technologies like AI and machine learning with traditional art valuation methods, the system ensures precise and reliable valuations for various types of artworks.

In an exemplary implementation, the database 302 may store metadata for a painting by Vincent van Gogh, including its creation date, dimensions, medium, and provenance. The auction module 304 may gather data from recent auctions where van Gogh's works were sold, providing a benchmark for pricing. The private collection module 306 may include information from private collectors who own van Gogh's artworks, adding to the valuation data. The scrapers 308 may collect trending data from social media platforms where van Gogh's works are discussed. The observational data may include the condition of the painting, such as any restorations or damages. The set of observational rules 312 may evaluate the impact of van Gogh's posthumous sales on the artwork's value. The historical model application 318 may use past sales data to predict future valuations. The model drifting analysis 320 and a model file 322 ensure the predictive models remain accurate. The inference module 316 processes all this data to infer the current market value of the painting, which is then summarized in the pricing indication table 324.

This detailed description of the system architecture 300 illustrates how each module and data source contributes to the comprehensive analysis and valuation of artworks, ensuring accurate and reliable predictions.

Figure 4:
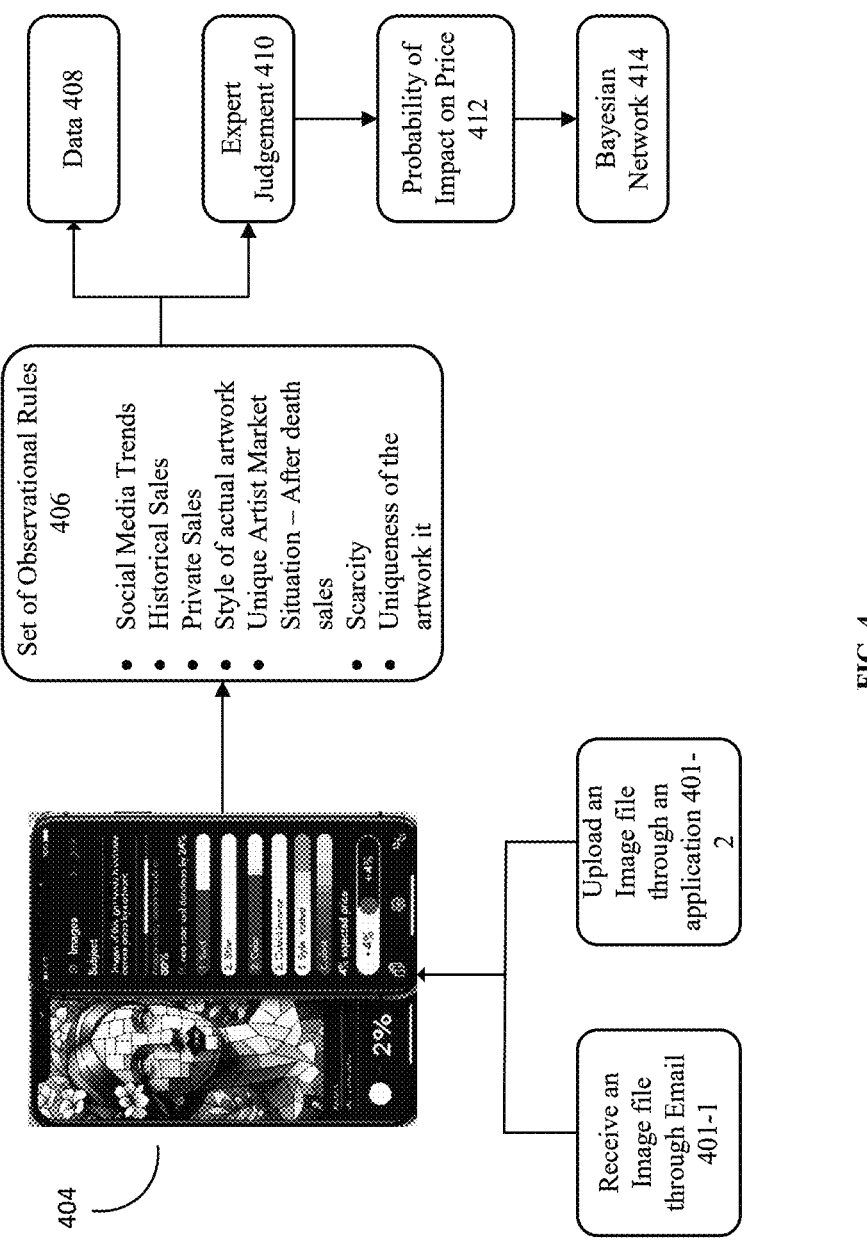
FIG. 4 illustrates a process for receiving and analysing an image file for the purpose of art valuation, according to certain embodiments.

FIG. 4 illustrates a process for receiving and analysing an image file for the purpose of art valuation, in accordance with embodiments of the present disclosure.

The process begins with receiving an image file through different methods. The image file can be received through email, as indicated by reference numeral 401-1, or uploaded through an application, as indicated by reference numeral 401-2. These methods ensure that the system 108 can intake images from various sources, providing flexibility and ease of use for the user.

Once the image file is received, the system 108 employs a set of observational rules 406, to analyse the image. These observational rules 406 standardize the analysis process and include various criteria. Social media trends are analysed to determine how frequently an artwork or artist is mentioned across various social media platforms, identifying spikes in popularity. Historical sales data is compared to the current state of the market to detect patterns and predict future trends. Data from private sales is incorporated to provide a comprehensive view of the market value of the artwork. The style of the actual artwork is evaluated, considering styles such as impressionist, modern, or abstract, and their impact on market demand. The unique artist market situation is considered, including specific factors like an artist's death, which often leads to a surge in the value of their works. Scarcity is assessed by evaluating the availability of similar works in the market, with rarer works typically having higher value. The uniqueness of the artwork is also considered, looking at features that make the artwork unique, such as the use of rare materials, unique techniques, or notable provenance.

The observational rules 406 are applied to the data 404 collected from the user 102, associated with the image. The data 404 may include metadata such as the artist's name, creation date, medium, dimensions, and provenance. By analysing this comprehensive set of criteria, the system 108 ensures a thorough evaluation of the artwork.

Next, the system 108 incorporates expert judgement 410 to refine the analysis. Experts in the field provide insights and assessments based on their experience and knowledge, enhancing the accuracy of the valuation. The expert judgement 410 is crucial in interpreting the data and applying nuanced understanding that automated systems alone may not achieve.

The system 108 then calculates the probability of impact on price 412. Calculation process includes determining how various factors influence the market value of the artwork. The system 108 employs a Bayesian network 414, to model these probabilities. The Bayesian network 414 is a statistical model that represents a set of variables and their conditional dependencies via a directed acyclic graph. This model helps in predicting the likely increase or decrease in the valuation of the artwork based on the analysis conducted.

Bayesian networks 414 are well-understood probabilistic modelling techniques that compactly represent a joint distribution over a number of random variables, structurally incorporating conditional independence assumptions about these variables. Each node in a Bayesian network 414 represents a random variable, and the directed links between nodes represent conditional dependencies. The nodes that point to a particular node are called its "parents," while the nodes reachable from a node via directed links are termed its "descendants" or "children." The structure of the network implies that a node is conditionally independent of its non-descendants given its parents.

The entire distribution within the Bayesian network 414 is encoded in the conditional probability tables (CPTs) of a child node given its parents. Nodes without parents have their own probability distributions. The probability of a particular instantiation of the entire network is the product of the probabilities of each child node given its parents. This probabilistic framework allows the system 108 to model complex dependencies and interactions among various factors affecting artwork valuation.

In the context of the AI engine 214 described, the Bayesian network 414 includes nodes representing various observational parameters, such as social media trends, historical sales data, private sales records, the style of the artwork, the unique market situation of the artist, scarcity, and the uniqueness of the artwork. For example, in the case of Andy Warhol, scarcity is not a variable factor since his works are owned by a single family, maintaining consistent scarcity. This consistent factor is encoded within the Bayesian network 414, reflecting the specific market dynamics for Warhol's artworks.

The observational data lake stores raw data that is processed to generate observations relevant to the Bayesian network 414. Subject matter experts determine the relevance of these observations, ensuring that only pertinent data influences the model. For instance, the model might incorporate data on the frequency of an artist's mention on social media platforms, historical sales patterns, and unique stylistic elements of the artwork.

The Bayesian network 414 operates as follows: each node representing an observational parameter (e.g., market trend, artist reputation) is linked to nodes representing other dependent variables. For instance, a node for social media trends might influence nodes for artist popularity and market demand. The conditional probabilities are determined based on historical data and expert analysis, providing a probabilistic framework for predicting the impact of various factors on the artwork's valuation.

The network structure allows for the integration of both visual and textual data, enabling a comprehensive analysis. The visual features extracted from the artwork and the contextual metadata are combined to form a holistic view, processed through the Bayesian network 414 to estimate valuation probabilities. These probabilities reflect the potential increase or decrease in the market value of the artwork, providing users with a data-driven prediction of its worth.

The network allows for dynamic adjustments to the Bayesian networks 414, incorporating new data and trends to refine the valuation predictions. By leveraging advanced statistical techniques and expert inputs, the Bayesian network 414 provides accurate and reliable predictions of an artwork's market value.

Figure 5:
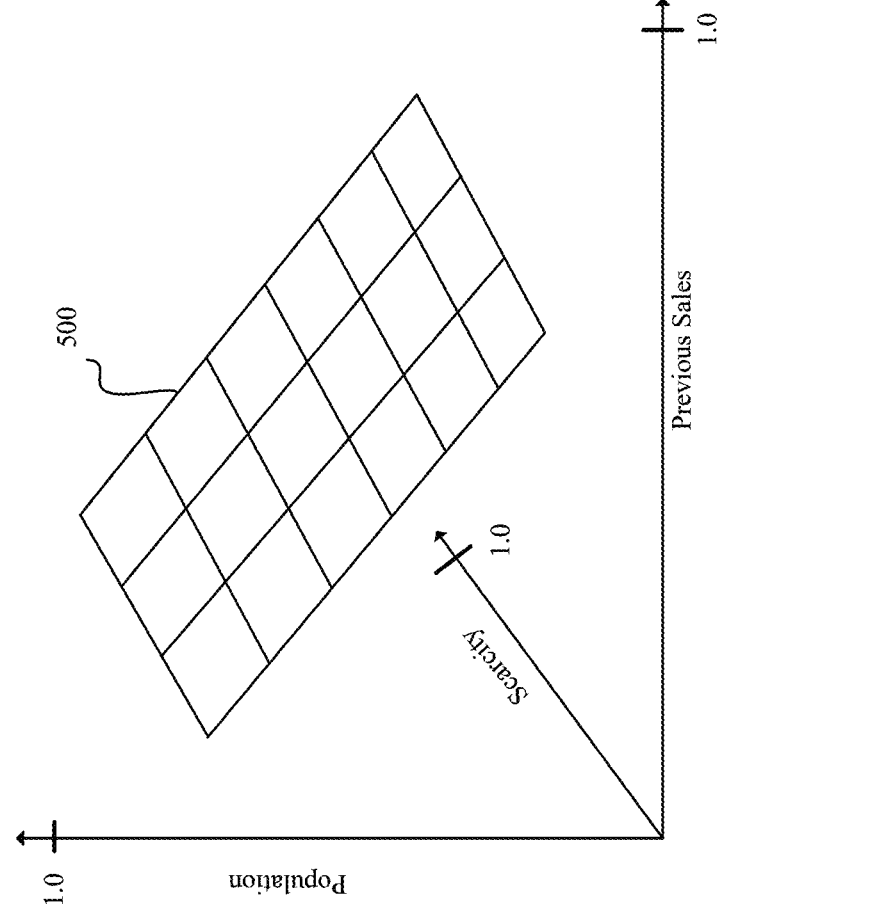
FIG. 5 illustrates a graphical representation of a probable valuation of an artwork, according to certain embodiments.

FIG. 5 illustrates a graphical representation of a probable valuation of an artwork, in accordance with embodiments of the present disclosure. The probable valuation is calculated based on a multidimensional Bayesian network 414, which is used to model and predict the probable valuation of artworks by analysing various factors and their interdependencies.

The graph depicts three primary dimensions: population, previous sales, and scarcity. Each axis represents a distinct factor influencing the artwork's valuation. For example, the x-axis may represent the popularity of the artwork or artist, the y-axis may represent the historical sales data, and the z-axis may represent the scarcity of the artwork.

In this model, popularity of the artwork, scarcity of the artwork, and historical sale, i.e. previous years sales are the considered factors. The graph indicates the relationship and influence these three factors have on each other. The graph form a three-dimensional manifold that visualizes the interaction between these factors. The Bayesian network 414 extends beyond three dimensions to include additional factors relevant to different artworks and artists, providing a comprehensive analysis.

The Bayesian network 414 utilizes an observational data lake, where raw data is stored and processed. This data includes various observational parameters, such as market trends, artist reputation, and unique features of the artwork. Observations are generated from this data lake based on relevance to the Bayesian network 414, as determined by subject matter experts. For instance, in the case of Andy Warhol, scarcity is not a variable factor since his works are owned by a single family, maintaining consistent scarcity.

The Bayesian network 414 utilized in the system 108 leverages an observational data lake where raw data, such as market trends, artist reputation, and unique features of the artwork, is stored and processed. This data lake forms the foundational input for the Bayesian network 414, which uses probabilistic modelling techniques to analyse and predict the valuation of artworks.

Graphical User Interface

Figure 6:
FIG. 6 illustrates an exemplary graphical user interface (GUI) for addition of an artwork displayed on a user device, according to certain embodiments.

FIG. 6 illustrates an exemplary graphical user interface (GUI) for addition of an artwork, according to certain embodiments. The GUI is displayed on a user device and is configured to display, via the display unit, a graphical user interface that includes an image capture option for receiving an image of an artwork from the user. The GUI further receives, through the graphical user interface, user-provided details including artist name, artwork title, year of creation, medium, material, and artwork dimensions, and automatically generating an inventory identifier for the artwork. In one implementation the GUI comprises an "Add Artwork" screen including a dropdown menu for year of creation, wherein a user is selectable to specify a known year or select "Unknown." Dimension entry fields accept height and width in centimeters and inches. A control labeled "Add Artwork" saves the entered details and uploads the image for pre-processing to enhance image quality for analysis, analyzing by a computer vision module to generate visual embeddings representing features of the artwork, combining by an artificial intelligence engine the visual embeddings with contextual data obtained from a metadata library and a statistical identifiers database to generate feature representations, generating by an authentication unit an authentication output indicative of authenticity of the artwork, and determining by a valuation probability calculator a valuation probability by applying at least one probabilistic model to integrate the feature representations, the authentication output, and contextual market data.

The GUI comprises at least one graphical object to display identified specific subjects in the artwork, wherein the specific subjects include a muse or notable person depicted in the artwork. The GUI further comprises at least one graphical object displaying the identified art identifiers and their corresponding data; upon receiving user input selecting a particular art identifier, the GUI displays detailed information related to the selected art identifier. The GUI is further configured to present a human-in-the-loop active learning process in which uncertain cases are visually flagged on the display unit for expert annotation, and wherein the annotations provided through the graphical user interface are stored and used to retrain the artificial intelligence engine. The GUI is configured to enable subject matter experts to curate and input subject matter identifiers into the metadata library, and to allow entry, review, and validation of statistical identifiers including at least artist identification, signature presence, size, provenance, or historical sales of the artwork, the curated data being stored in the metadata library and the statistical identifiers database for use by the system.

To support ingestion and portfolio management, the GUI comprises a plurality of graphical objects for uploading the image from a database corresponding to the user, categorizing the artworks, and viewing a collection of the artworks. The GUI further comprises at least one graphical object for enabling the user to send the image via an electronic mail to a system operator, wherein, upon receiving the image by the system operator, the image is uploaded and displayed in the inventory module by the system operator. The GUI also provides an interface for receiving historical sales data and integrating it into the statistical identifiers database to enhance the accuracy of the analysis.

When analysis completes, the GUI is configured to display, through the GUI on the display unit, graphical visualizations of the authentication output and the valuation probability corresponding to the artwork. The authentication output comprises an authentication status, a confidence score, and factor-level indicators. The valuation probability comprises a probabilistic score of value change, a confidence interval or probability distribution, anomaly indications, and graphical visualizations including at least one of a chart, graph, heat map, or interactive representation showing contributions of visual, contextual, and historical factors. Example visuals include probability distributions of value change over selectable horizons; anomaly detections overlaying predicted versus current prices; and explainable-AI factor contributions shown as stacked bar charts, heat maps of image regions most influential to authenticity, and interactive representations that reveal provenance, signature presence, size, medium, and historical sales impacts.

Figure 7:
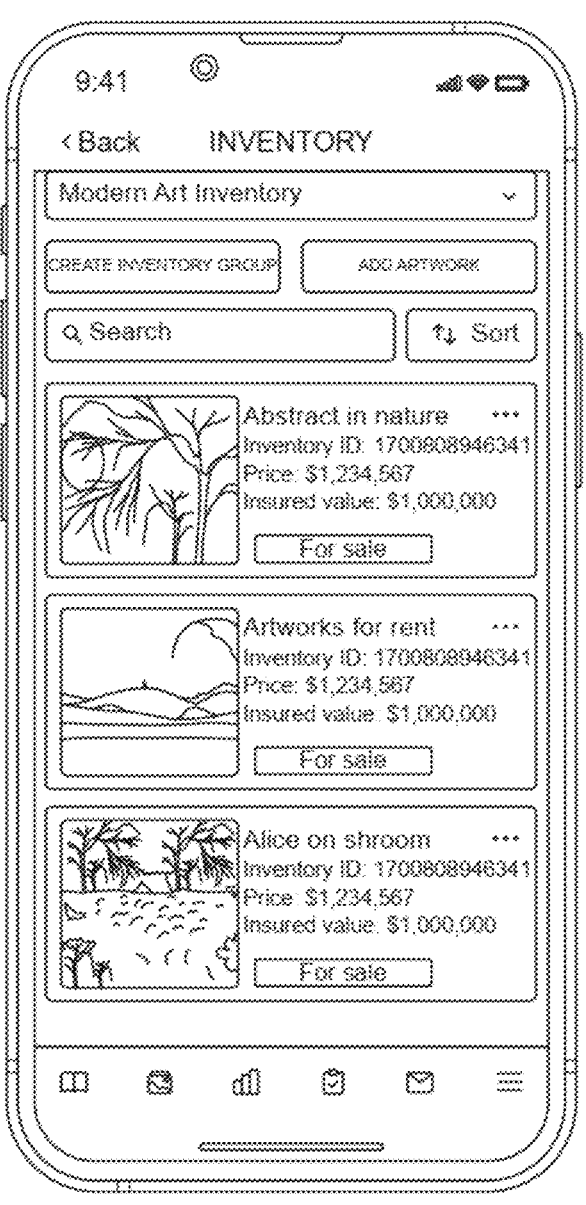
FIG. 7 illustrates an exemplary graphical user interface (GUI) for accessing an inventory module displayed on the user device, according to certain embodiments.

FIG. 7 illustrates an exemplary graphical user interface for accessing an inventory module, according to certain embodiments. The GUI is configured to render, on the display unit, an inventory screen comprising a searchable and scrollable list of stored artworks, each entry including a thumbnail image, the inventory identifier, the title, the current price, and an estimated valuation. A search bar allows users to search for specific artworks within the inventory and a scan control enables the user to scan new artworks into the inventory. Each artwork entry includes graphical objects for user interaction such as viewing more details, editing artwork information, or marking the artwork for sale; upon selection, the GUI enables user interaction with the GUI to view detailed information related to the identified art identifiers and valuation probability.

Selecting an artwork row opens an analysis view that displays the authentication output and the valuation probability. The authentication output comprises an authentication status, a confidence score, and factor-level indicators. The valuation probability comprises a probabilistic score of value change, a confidence interval or probability distribution, anomaly indications, and graphical visualizations including at least one of a chart, graph, heat map, or interactive representation showing contributions of visual, contextual, and historical factors. In exemplary renderings, the GUI presents probability distributions as density curves with selectable horizons, anomaly indications as badges where the calculated valuation probability differs from observed market prices, and explainable AI factor contributions as interactive charts enabling drill-down into brush-strokes, textures, shapes, color distributions, provenance, signature presence, medium, condition, and historical sales records.

The inventory GUI also exposes administrative and expert modes. In expert mode the graphical user interface is configured to enable subject matter experts to curate and input subject matter identifiers into the metadata library, and to allow entry, review, and validation of statistical identifiers including at least artist identification, signature presence, size, provenance, or historical sales of the artwork. The interface for receiving historical sales data enables bulk import or manual entry of auction results and private sales, which are integrated into the statistical identifiers database. Uncertain cases detected by the authentication unit or the valuation probability calculator are visually flagged within list entries; selecting a flag launches a human-in-the-loop panel for expert annotation, and the annotations provided through the graphical user interface are stored and used to retrain the artificial intelligence engine.

Figure 8:
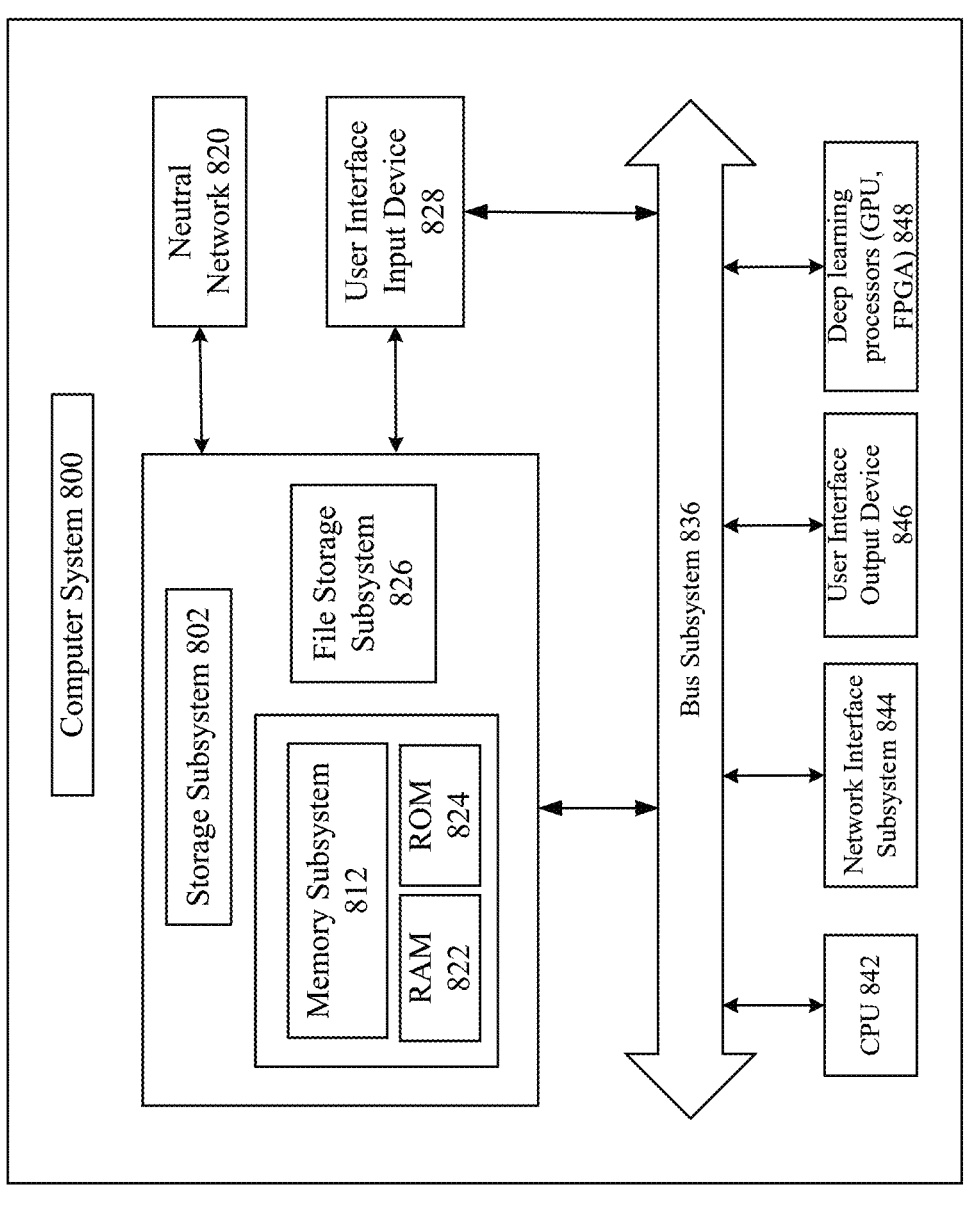
FIG. 8 an example computer system that can be used to implement the technology disclosed, according to certain embodiments.

FIG. 8 shows an example computer system 800 that can be used to implement the technology disclosed. Computer system 800 includes at least one central processing unit (CPU) 872 that communicates with a number of peripheral devices via bus subsystem 855. These peripheral devices can include a storage subsystem 810 including, for example, memory devices and a file storage subsystem 836, user interface input devices 838, user interface output devices 876, and a network interface subsystem 874. The input and output devices allow user interaction with computer system 800. Network interface subsystem 874 provides an interface to outside networks, including an interface to corresponding interface devices in other computer systems.

In one implementation, the annotation network 804 is communicably linked to the storage subsystem 810 and the user interface input devices 838.

User interface input devices 838 can include a keyboard, pointing devices such as a mouse, trackball, touchpad, or graphics tablet, a scanner, a touch screen incorporated into the display unit, audio input devices such as voice recognition systems and microphones, and other types of input devices. In general, use of the term "input device" is intended to include all possible types of devices and ways to input information into computer system 800.

User interface output devices 876 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 800 to the user or to another machine or computer system.

Storage subsystem 810 stores programming and data constructs that provide the functionality of some or all of the modules and methods described herein. These software modules are generally executed by processors 878.

Processors 878 can be graphics processing units (GPUs), field-programmable gate arrays (FPGAs), application-specific integrated circuits (ASICs), and/or coarse-grained reconfigurable architectures (CGRAs). Processors 878 can be hosted by a deep learning cloud platform such as Google Cloud Platform™, Xilinx™, and Cirrascale™. Examples of processors 878 include Google's Tensor Processing Unit (TPU)™, rackmount solutions like GX4 Rackmount Series™, GX52 Rackmount Series™, NVIDIA DGX-1™, Microsoft' Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, Lambda GPU Server with Testa V100s™, and others.

Memory subsystem 822 used in the storage subsystem 810 can include a number of memories including a main random access memory (RAM) 832 for storage of instructions and data during program execution and a read only memory (ROM) 834 in which fixed instructions are stored. A file storage subsystem 836 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 836 in the storage subsystem 810, or in other machines accessible by the processor.

Bus subsystem 855 provides a mechanism for letting the various components and subsystems of computer system 800 communicate with each other as intended. Although bus subsystem 855 is shown schematically as a single bus, alternative implementations of the bus subsystem can use multiple busses.

Computer system 800 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 800 depicted in FIG. 8 is intended only as a specific example for purposes of illustrating the preferred implementations of the present invention. Many other configurations of computer system 800 are possible having more or less components than the computer system depicted in FIG. 8.

Numerous modifications and variations of the present disclosure are possible in light of the above teachings. It is therefore to be understood that within the scope of the appended claims, the invention may be practiced otherwise than as specifically described herein.

Artificial Intelligence System Implementation

The system described in conjunction with FIG. 1 to FIG. 7 comprises one or more subsystems based on Artificial Intelligence. Implementation of the subsystems based on the Artificial Subsystems is illustrated by FIGS. 9 to 18.

Some implementations of the technology disclosed relate to using a Transformer model to provide an AI system. In particular, the technology disclosed proposes a parallel input, parallel output (PIPO) AI system based on the Transformer architecture. The Transformer model relies on a self-attention mechanism to compute a series of context-informed vector-space representations of elements in the input sequence and the output sequence, which are then used to predict distributions over subsequent elements as the model predicts the output sequence element-by-element. Not only is this mechanism straightforward to parallelize, but as each input's representation is also directly informed by all other inputs' representations, this results in an effectively global receptive field across the whole input sequence. This stands in contrast to, e.g., convolutional architectures which typically only have a limited receptive field.

In one implementation, the disclosed AI system is a multilayer perceptron (MLP). In another implementation, the disclosed AI system is a feedforward neural network. In yet another implementation, the disclosed AI system is a fully connected neural network. In a further implementation, the disclosed AI system is a fully convolution neural network. In a yet further implementation, the disclosed AI system is a semantic segmentation neural network. In a yet another further implementation, the disclosed AI system is a generative adversarial network (GAN) (e.g., CycleGAN, StyleGAN, pixelRNN, text-2-image, DiscoGAN, IsGAN). In a yet another implementation, the disclosed AI system includes self-attention mechanisms like Transformer, Vision Transformer (ViT), Bidirectional Transformer (BERT), Detection Transformer (DETR), Deformable DETR, UP-DETR, DeiT, Swin, GPT, iGPT, GPT-2, GPT-3, various ChatGPT versions, various LLaMA versions, BERT, Span-BERT, RoBERTa, XLNet, ELECTRA, UniLM, BART, T5, ERNIE (THU), KnowBERT, DeiT-Ti, DeiT-S, DeiT-B, T2T-ViT-14, T2T-ViT-19, T2T-ViT-24, PVT-Small, PVT-Medium, PVT-Large, TNT-S, TNT-B, CPVT-S, CPVT-S-GAP, CPVT-B, Swin-T, Swin-S, Swin-B, Twins-SVT-S, Twins-SVT-B, Twins-SVT-L, Shuffle-T, Shuffle-S, Shuffle-B, XCiT-S12/16, CMT-S, CMT-B, VOLO-D1, VOLO-D2, VOLO-D3, VOLO-D4, MoCo v3, ACT, TSP, Max-Deep-Lab, VisTR, SETR, Hand-Transformer, HOT-Net, METRO, Image Transformer, Taming transformer, TransGAN, IPT, TTSR, STTN, Masked Transformer, CLIP, DALL-E, Cogview, UniT, ASH, TinyBert, FullyQT, ConvBert, FCOS, Faster R-CNN+FPN, DETR-DC5, TSP-FCOS, TSP-RCNN, ACT+MKDD (L=32), ACT+MKDD (L=16), SMCA, Efficient DETR, UP-DETR, UP-DETR, ViTB/16-FRCNN, ViT-B/16-FRCNN, PVT-Small+RetinaNet, Swin-T+RetinaNet, Swin-T+ATSS, PVT-Small+DETR, TNT-S+DETR, YOLOS-Ti, YOLOS-S, and YOLOS-B.

In one implementation, the disclosed AI system is a convolution neural network (CNN) with a plurality of convolution layers. In another implementation, the disclosed AI system is a recurrent neural network (RNN) such as a long short-term memory network (LSTM), bi-directional LSTM (Bi-LSTM), or a gated recurrent unit (GRU). In yet another implementation, the disclosed AI system includes both a CNN and an RNN.

In yet other implementations, the disclosed AI system can use 1D convolutions, 2D convolutions, 3D convolutions, 4D convolutions, 5D convolutions, dilated or atrous convolutions, transpose convolutions, depthwise separable convolutions, pointwise convolutions, 1×1 convolutions, group convolutions, flattened convolutions, spatial and cross-channel convolutions, shuffled grouped convolutions, spatial separable convolutions, and deconvolutions. The disclosed AI system can use one or more loss functions such as logistic regression/log loss, multi-class cross-entropy/softmax loss, binary cross-entropy loss, mean-squared error loss, L1 loss, L2 loss, smooth L1 loss, and Huber loss. The disclosed AI system can use any parallelism, efficiency, and compression schemes such TFRecords, compressed encoding (e.g., PNG), sharding, parallel calls for map transformation, batching, prefetching, model parallelism, data parallelism, and synchronous/asynchronous stochastic gradient descent (SGD). The disclosed AI system can include upsampling layers, downsampling layers, recurrent connections, gates and gated memory units (like an LSTM or GRU), residual blocks, residual connections, highway connections, skip connections, peephole connections, activation functions (e.g., non-linear transformation functions like rectifying linear unit (ReLU), leaky ReLU, exponential liner unit (ELU), sigmoid and hyperbolic tangent (tanh)), batch normalization layers, regularization layers, dropout, pooling layers (e.g., max or average pooling), global average pooling layers, and attention mechanisms.

The disclosed AI system can be a linear regression model, a logistic regression model, an Elastic Net model, a support vector machine (SVM), a random forest (RF), a decision tree, and a boosted decision tree (e.g., XGBoost), or some other tree-based logic (e.g., metric trees, kd-trees, R-trees, universal B-trees, X-trees, ball trees, locality sensitive hashes, and inverted indexes). The disclosed AI system can be an ensemble of multiple models, in some implementations.

In some implementations, the disclosed AI system can be trained using backpropagation-based gradient update techniques. Example gradient descent techniques that can be used for training the disclosed AI system include stochastic gradient descent, batch gradient descent, and mini-batch gradient descent. Some examples of gradient descent optimization algorithms that can be used to train the disclosed AI system are Momentum, Nesterov accelerated gradient, Adagrad, Adadelta, RMSprop, Adam, AdaMax, Nadam, and AMSGrad.

Transformer Logic

Machine learning is the use and development of computer systems that can learn and adapt without following explicit instructions, by using algorithms and statistical models to analyze and draw inferences from patterns in data. Some of the state-of-the-art models use Transformers, a more powerful and faster model than neural networks alone. Transformers originate from the field of natural language processing (NLP), but can be used in computer vision and many other fields. Neural networks process input in series and weight relationships by distance in the series. Transformers can process input in parallel and do not necessarily weigh by distance. For example, in natural language processing, neural networks process a sentence from beginning to end with the weights of words close to each other being higher than those further apart. This leaves the end of the sentence very disconnected from the beginning causing an effect called the vanishing gradient problem. Transformers look at each word in parallel and determine weights for the relationships to each of the other words in the sentence. These relationships are called hidden states because they are later condensed for use into one vector called the context vector. Transformers can be used in addition to neural networks. This architecture is described here.

Encoder-Decoder Architecture

Figure 9:
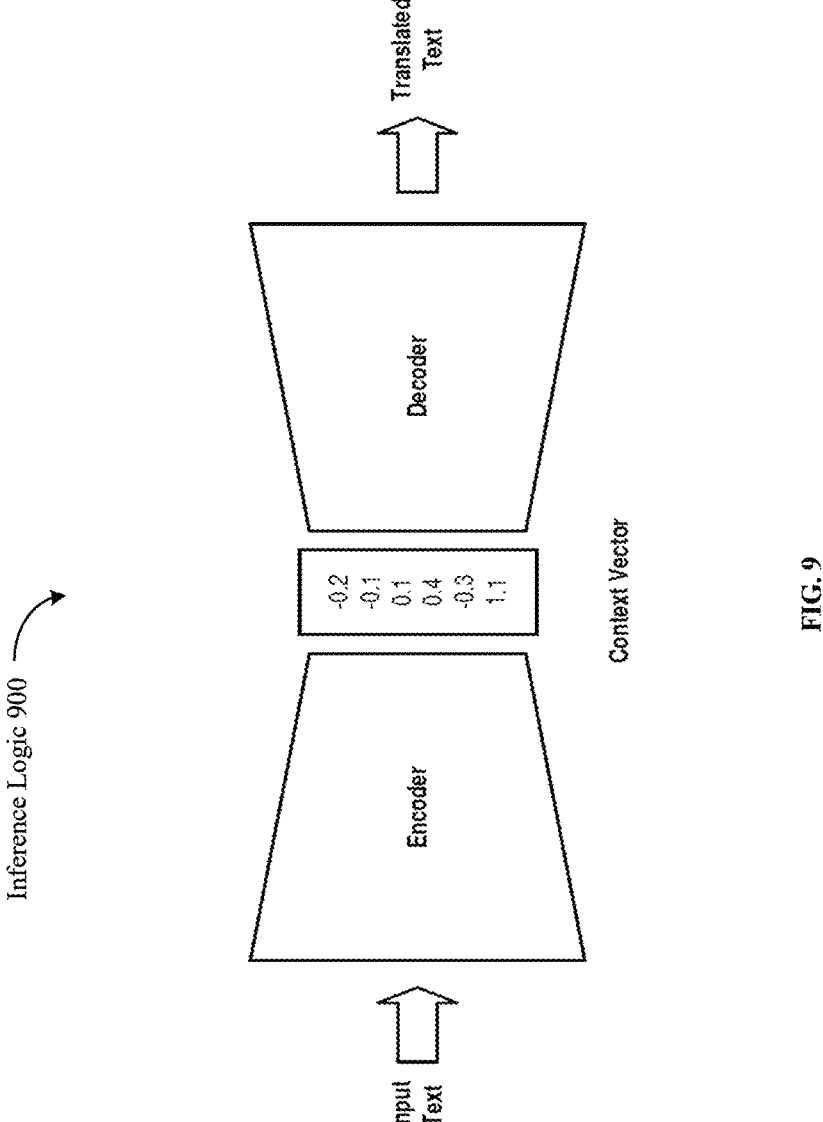
FIG. 9 is a schematic representation of an encoder-decoder architecture, according to certain embodiments, according to certain embodiments.

FIG. 9 is a schematic representation of an encoder-decoder architecture. This architecture is often used for NLP and has two main building blocks. The first building block is the encoder that encodes an input into a fixed-size vector. In the system we describe here, the encoder is based on a recurrent neural network (RNN). At each time step, t, a hidden state of time step, t-1, is combined with the input value at time step t to compute the hidden state at timestep t. The hidden state at the last time step, encoded in a context vector, contains relationships encoded at all previous time steps. For NLP, each step corresponds to a word. Then the context vector contains information about the grammar and the sentence structure. The context vector can be considered a low-dimensional representation of the entire input space. For NLP, the input space is a sentence, and a training set consists of many sentences.

The context vector is then passed to the second building block, the decoder. For translation, the decoder has been trained on a second language. Conditioned on the input context vector, the decoder generates an output sequence. At each time step, t, the decoder is fed the hidden state of time step, t−1, and the output generated at time step, t−1. The first hidden state in the decoder is the context vector, generated by the encoder. The context vector is used by the decoder to perform the translation.

The whole model is optimized end-to-end by using back-propagation, a method of training a neural network in which the initial system output is compared to the desired output and the system is adjusted until the difference is minimized. In backpropagation, the encoder is trained to extract the right information from the input sequence, the decoder is trained to capture the grammar and vocabulary of the output language. This results in a fluent model that uses context and generalizes well. When training an encoder-decoder model, the real output sequence is used to train the model to prevent mistakes from stacking. When testing the model, the previously predicted output value is used to predict the next one.

When performing a translation task using the encoder-decoder architecture, all information about the input sequence is forced into one vector, the context vector. Information connecting the beginning of the sentence with the end is lost, the vanishing gradient problem. Also, different parts of the input sequence are important for different parts of the output sequence, information that cannot be learned using only RNNs in an encoder-decoder architecture.

Attention Mechanism

Figure 10:
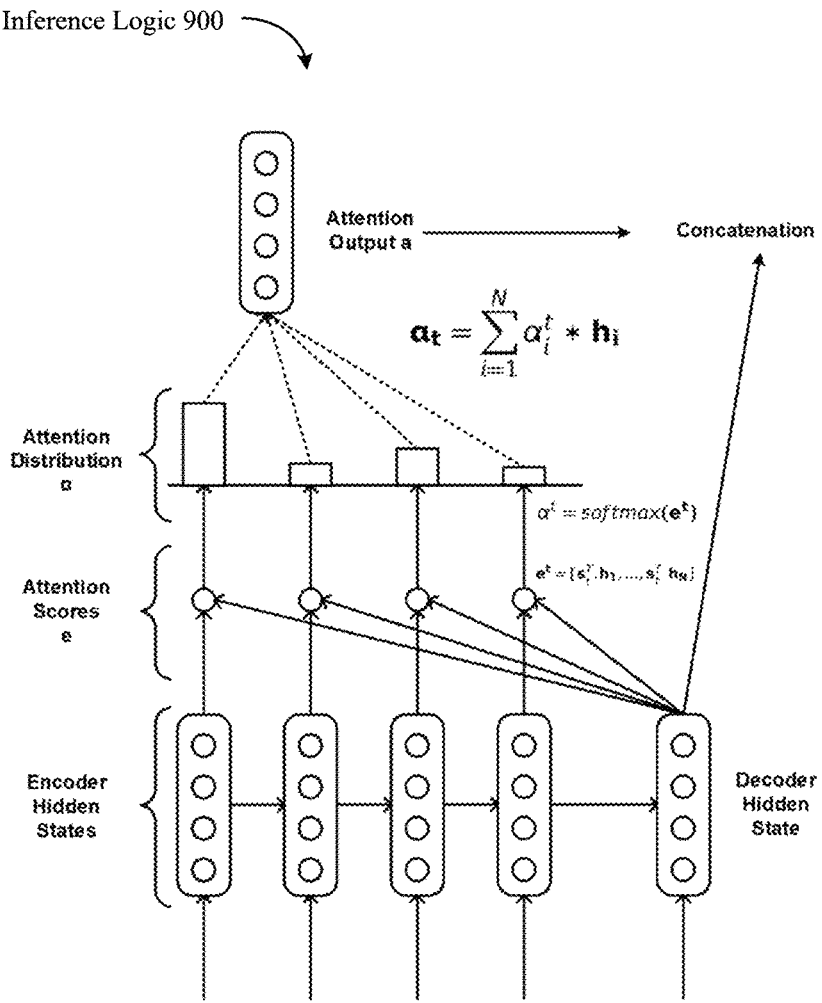
FIG. 10 shows an overview of an attention mechanism added onto an RNN encoder-decoder architecture, according to certain embodiments.

Attention mechanisms distinguish Transformers from other machine learning models. The attention mechanism provides a solution for the vanishing gradient problem. FIG. 10 shows an overview of an attention mechanism added onto an RNN encoder-decoder architecture. At every step, the decoder is given an attention score, e, for each encoder hidden state. In other words, the decoder is given weights for each relationship between words in a sentence. The decoder uses the attention score concatenated with the context vector during decoding. The output of the decoder at time step t is based on all encoder hidden states and the attention outputs. The attention output captures the relevant context for time step t from the original sentence. Thus, words at the end of a sentence may now have a strong relationship with words at the beginning of the sentence. In the sentence "The quick brown fox, upon arriving at the doghouse, jumped over the lazy dog," fox and dog can be closely related despite being far apart in this complex sentence.

To weight encoder hidden states, a dot product between the decoder hidden state of the current time step, and all encoder hidden states, is calculated. This results in an attention score for every encoder hidden state. The attention scores are higher for those encoder hidden states that are similar to the decoder hidden state of the current time step. Higher values for the dot product indicate the vectors are pointing more closely in the same direction. The attention scores are converted to fractions that sum to one using the SoftMax function.

The SoftMax scores provide an attention distribution. The x-axis of the distribution is position in a sentence. The y-axis is attention weight. The scores show which encoder hidden states are most closely related. The SoftMax scores specify which encoder hidden states are the most relevant for the decoder hidden state of the current time step.

The elements of the attention distribution are used as weights to calculate a weighted sum over the different encoder hidden states. The outcome of the weighted sum is called the attention output. The attention output is used to predict the output, often in combination (concatenation) with the decoder hidden states. Thus, both information about the inputs, as well as the already generated outputs, can be used to predict the next outputs.

By making it possible to focus on specific parts of the input in every decoder step, the attention mechanism solves the vanishing gradient problem. By using attention, information flows more directly to the decoder. It does not pass through many hidden states. Interpreting the attention step can give insights into the data. Attention can be thought of as a soft alignment. The words in the input sequence with a high attention score align with the current target word. Attention describes long-range dependencies better than RNN alone. This enables analysis of longer, more complex sentences.

The attention mechanism can be generalized as: given a set of vector values and a vector query, attention is a technique to compute a weighted sum of the vector values, dependent on the vector query. The vector values are the encoder hidden states, and the vector query is the decoder hidden state at the current time step.

The weighted sum can be considered a selective summary of the information present in the vector values. The vector query determines on which of the vector values to focus. Thus, a fixed-size representation of the vector values can be created, in dependence upon the vector query.

The attention scores can be calculated by the dot product, or by weighing the different values (multiplicative attention).

Embeddings

For most machine learning models, the input to the model needs to be numerical. The input to a translation model is a sentence, and words are not numerical. multiple methods exist for the conversion of words into numerical vectors. These numerical vectors are called the embeddings of the words. Embeddings can be used to convert any type of symbolic representation into a numerical one.

Embeddings can be created by using one-hot encoding. The one-hot vector representing the symbols has the same length as the total number of possible different symbols. Each position in the one-hot vector corresponds to a specific symbol. For example, when converting colors to a numerical vector, the length of the one-hot vector would be the total number of different colors present in the dataset. For each input, the location corresponding to the color of that value is one, whereas all the other locations are valued at zero. This works well for working with images. For NLP, this becomes problematic, because the number of words in a language is very large. This results in enormous models and the need for a lot of computational power. Furthermore, no specific information is captured with one-hot encoding. From the numerical representation, it is not clear that orange and red are more similar than orange and green. For this reason, other methods exist.

A second way of creating embeddings is by creating feature vectors. Every symbol has its specific vector representation, based on features. With colors, a vector of three elements could be used, where the elements represent the amount of yellow, red, and/or blue needed to create the color. Thus, all colors can be represented by only using a vector of three elements. Also, similar colors have similar representation vectors.

For NLP, embeddings based on context, as opposed to words, are small and can be trained. The reasoning behind this concept is that words with similar meanings occur in similar contexts. Different methods take the context of words into account. Some methods, like GloVe, base their context embedding on co-occurrence statistics from corpora (large texts) such as Wikipedia. Words with similar co-occurrence statistics have similar word embeddings. Other methods use neural networks to train the embeddings. For example, they train their embeddings to predict the word based on the context (Common Bag of Words), and/or to predict the context based on the word (Skip-Gram). Training these contextual embeddings is time intensive. For this reason, pre-trained libraries exist. Other deep learning methods can be used to create embeddings. For example, the latent space of a variational autoencoder (VAE) can be used as the embedding of the input. Another method is to use 1D convolutions to create embeddings. This causes a sparse, high-dimensional input space to be converted to a denser, low-dimensional feature space.

Self-Attention: Queries (Q), Keys (K), Values (V)

Transformer models are based on the principle of self-attention. Self-attention allows each element of the input sequence to look at all other elements in the input sequence and search for clues that can help it to create a more meaningful encoding. It is a way to look at which other sequence elements are relevant for the current element. The Transformer can grab context from both before and after the currently processed element.

When performing self-attention, three vectors need to be created for each element of the encoder input: the query vector (Q), the key vector (K), and the value vector (V). These vectors are created by performing matrix multiplications between the input embedding vectors using three unique weight matrices.

After this, self-attention scores are calculated. When calculating self-attention scores for a given element, the dot products between the query vector of this element and the key vectors of all other input elements are calculated. To make the model mathematically more stable, these self-attention scores are divided by the root of the size of the vectors. This has the effect of reducing the importance of the scalar thus emphasizing the importance of the direction of the vector. Just as before, these scores are normalized with a SoftMax layer. This attention distribution is then used to calculate a weighted sum of the value vectors, resulting in a vector z for every input element. In the attention principle explained above, the vector to calculate attention scores and to perform the weighted sum was the same, in self-attention two different vectors are created and used. As the self-attention needs to be calculated for all elements (thus a query for every element), one formula can be created to calculate a Z matrix. The rows of this Z matrix are the z vectors for every sequence input element, giving the matrix a size length sequence dimension QKV.

Figure 11:
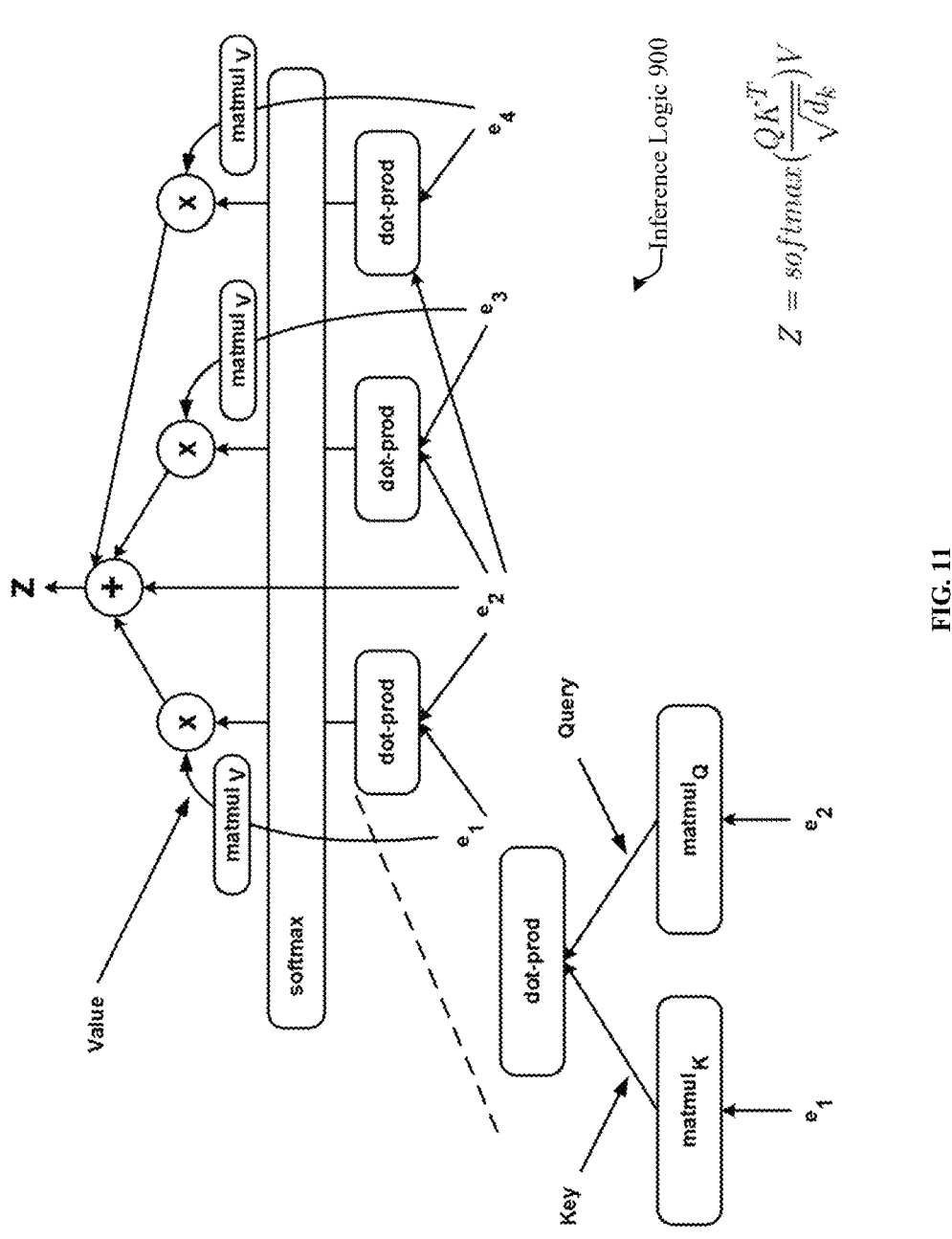
FIG. 11 is a schematic representation of the calculation of self-attention showing one attention head.

Multi-headed attention is executed in the Transformer. FIG. 11 is a schematic representation of the calculation of self-attention showing one attention head. For every attention head, different weight matrices are trained to calculate Q, K, and V. Every attention head outputs a matrix Z. Different attention heads can capture different types of information. The different Z matrices of the different attention heads are concatenated. This matrix can become large when multiple attention heads are used. To reduce dimensionality, an extra weight matrix W is trained to condense the different attention heads into a matrix with the same size as one Z matrix. This way, the amount of data given to the next step does not enlarge every time self-attention is performed.

When performing self-attention, information about the order of the different elements within the sequence is lost. To address this problem, positional encodings are added to the embedding vectors. Every position has its unique positional encoding vector. These vectors follow a specific pattern, which the Transformer model can learn to recognize. This way, the model can consider distances between the different elements.

As discussed above, in the core of self-attention are three objects: queries (Q), keys (K), and values (V). Each of these objects has an inner semantic meaning of their purpose. One can think of these as analogous to databases. We have a user-defined query of what the user wants to know. Then we have the relations in the database, i.e., the values which are the weights. More advanced database management systems create some apt representation of its relations to retrieve values more efficiently from the relations. This can be achieved by using indexes, which represent information about what is stored in the database. In the context of attention, indexes can be thought of as keys. So instead of running the query against values directly, the query is first executed on the indexes to retrieve where the relevant values or weights are stored. Lastly, these weights are run against the original values to retrieve data that is most relevant to the initial query.

Figure 12:
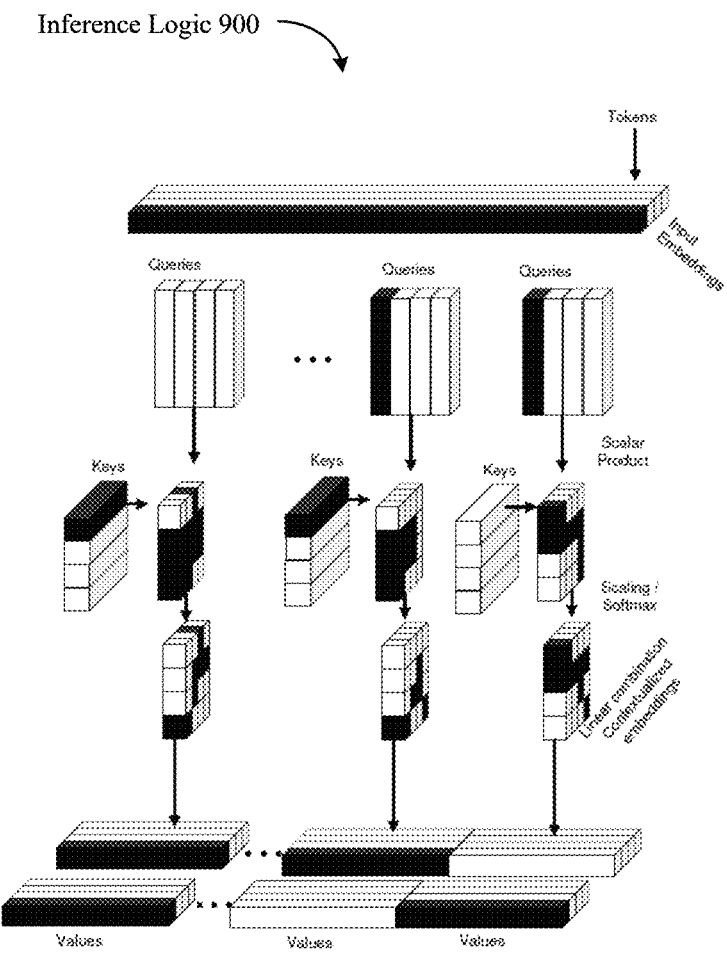
FIG. 12 is a depiction of several attention heads in a Transformer block.

FIG. 12 depicts several attention heads in a Transformer block. We can see that the outputs of queries and keys dot products in different attention heads are differently colored. This depicts the capability of the multi-head attention to focus on different aspects of the input and aggregate the obtained information by multiplying the input with different attention weights.

Examples of attention calculation include scaled dot-product attention and additive attention. There are several reasons why scaled dot-product attention is used in the Transformers. Firstly, the scaled dot-product attention is relatively fast to compute, since its main parts are matrix operations that can be run on modern hardware accelerators. Secondly, it performs similarly well for smaller dimensions of the K matrix, dk, as the additive attention. For larger dk, the scaled dot-product attention performs a bit worse because dot products can cause the vanishing gradient problem. This is compensated via the scaling factor, which is defined as dk.

As discussed above, the attention function takes as input three objects: key, value, and query. In the context of Transformers, these objects are matrices of shapes (n, d), where n is the number of elements in the input sequence and d is the hidden representation of each element (also called the hidden vector). Attention is then computed as:

$$\text{Attention}(Q, K, V) = \text{SoftMax}\left(\frac{QK^T}{\sqrt{dk}}\right)V$$

where Q, K, V are computed as:

$$X \cdot W_Q, X \cdot W_K, X \cdot W_V$$

X is the input matrix and WQ, WK, WV are learned weights to project the input matrix into the representations. The dot products appearing in the attention function are exploited for their geometrical interpretation where higher values of their results mean that the inputs are more similar, i.e., pointing in the geometrical space in the same direction. Since the attention function now works with matrices, the dot product becomes matrix multiplication. The SoftMax function is used to normalize the attention weights into the value of 1 prior to being multiplied by the values matrix. The resulting matrix is used either as input into another layer of attention or becomes the output of the Transformer.

Multi-Head Attention

Transformers become even more powerful when multi-head attention is used. Queries, keys, and values are computed the same way as above, though they are now projected into h different representations of smaller dimensions using a set of h learned weights. Each representation is passed into a different scaled dot-product attention block called a head. The head then computes its output using the same procedure as described above.

Formally, the multi-head attention is defined as:

$$MultiHeadAttention\,(Q, K, V) = [head1, \ldots, headh]W0 \text{ where } head_i = \\ \text{Attention}\left(QW_i^Q, KW_i^K, VW_i^V\right)$$

The outputs of all heads are concatenated together and projected again using the learned weights matrix W0 to match the dimensions expected by the next block of heads or the output of the Transformer. Using the multi-head attention instead of the simpler scaled dot-product attention enables Transformers to jointly attend to information from different representation subspaces at different positions.

Figure 13:
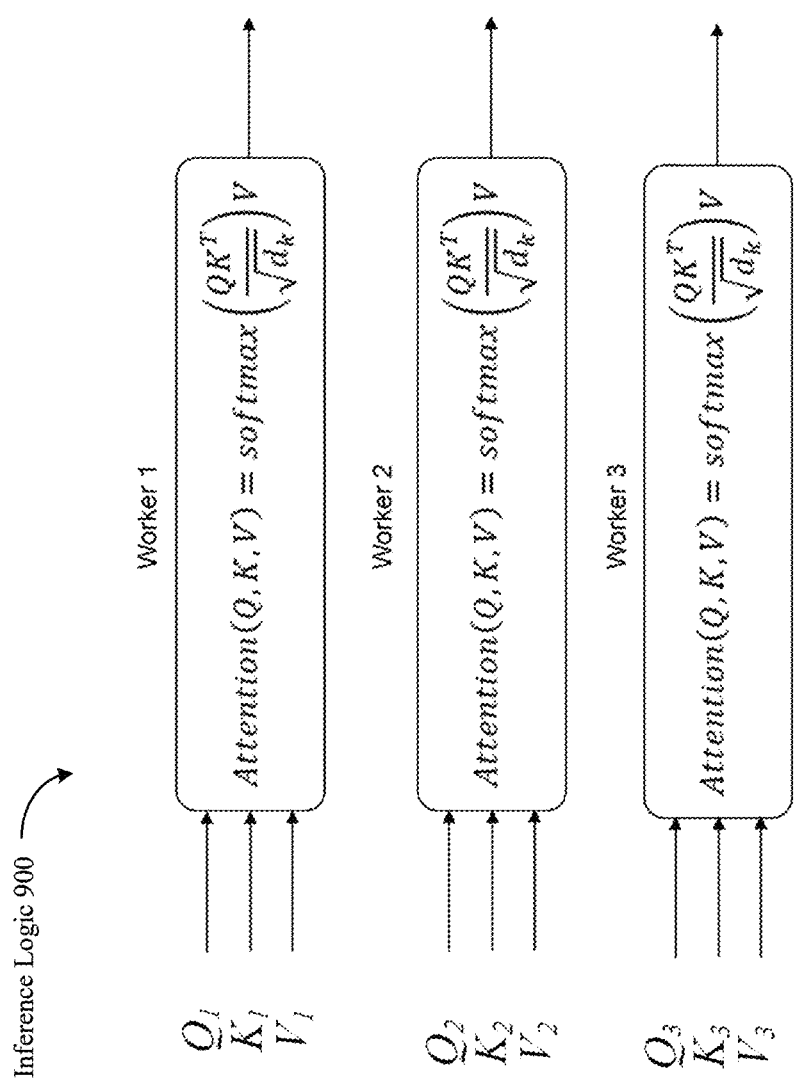
FIG. 13 is an illustration that shows how one can use multiple workers to compute the multi-head attention in parallel, as the respective heads compute their outputs independently of one another.

As shown in FIG. 13, one can use multiple workers to compute the multi-head attention in parallel, as the respective heads compute their outputs independently of one another. Parallel processing is one of the advantages of Transformers over RNNs.

Assuming the naive matrix multiplication algorithm which has a complexity of:

$$a \cdot b \cdot c$$

For matrices of shape (a, b) and (c, d), to obtain values Q, K, V, we need to compute the operations:

$$X \cdot WQ, X \cdot WK, X \cdot WV$$

The matrix X is of shape (n, d) where n is the number of patches and d is the hidden vector dimension. The weights WQ, WK, WV are all of shape (d, d). Omitting the constant factor 3, the resulting complexity is:

$$n \cdot d2$$

We can proceed to the estimation of the complexity of the attention function itself, i.e., of $$\text{SoftMax}\left(\frac{QK^T}{\sqrt{dk}}\right)V.$$

The matrices Q and K are both of shape (n, d). The transposition operation does not influence the asymptotic complexity of computing the dot product of matrices of shapes (n, d)·(d, n), therefore its complexity is:

$$n2 \cdot d$$

Scaling by a constant factor of $\sqrt{dk}$, where dk is the dimension of the keys vector, as well as applying the SoftMax function, both have the complexity of a·b for a matrix of shape (a, b), hence they do not influence the asymptotic complexity. Lastly the dot product SoftMax $$\left(\frac{QK^T}{\sqrt{dk}}\right) \cdot V$$

is between matrices of shapes (n, n) and (n, d) and so its complexity is:

$$n2 \cdot d$$

The final asymptotic complexity of scaled dot-product attention is obtained by summing the complexities of computing Q, K, V, and of the following attention function:

$$n \cdot d2 + n2 \cdot d.$$

The asymptotic complexity of multi-head attention is the same since the original input matrix X is projected into h matrices of shapes $$\left(n, \frac{d}{h}\right),$$

where h is the number of heads. From the point of view of asymptotic complexity, h is constant, therefore we would arrive at the same estimate of asymptotic complexity using a similar approach as for the scaled dot-product attention.

Transformer models often have the encoder-decoder architecture, although this is not necessarily the case. The encoder is built out of different encoder layers which are all constructed in the same way. The positional encodings are added to the embedding vectors. Afterward, self-attention is performed.

Encoder Block of Transformer

Figure 14:
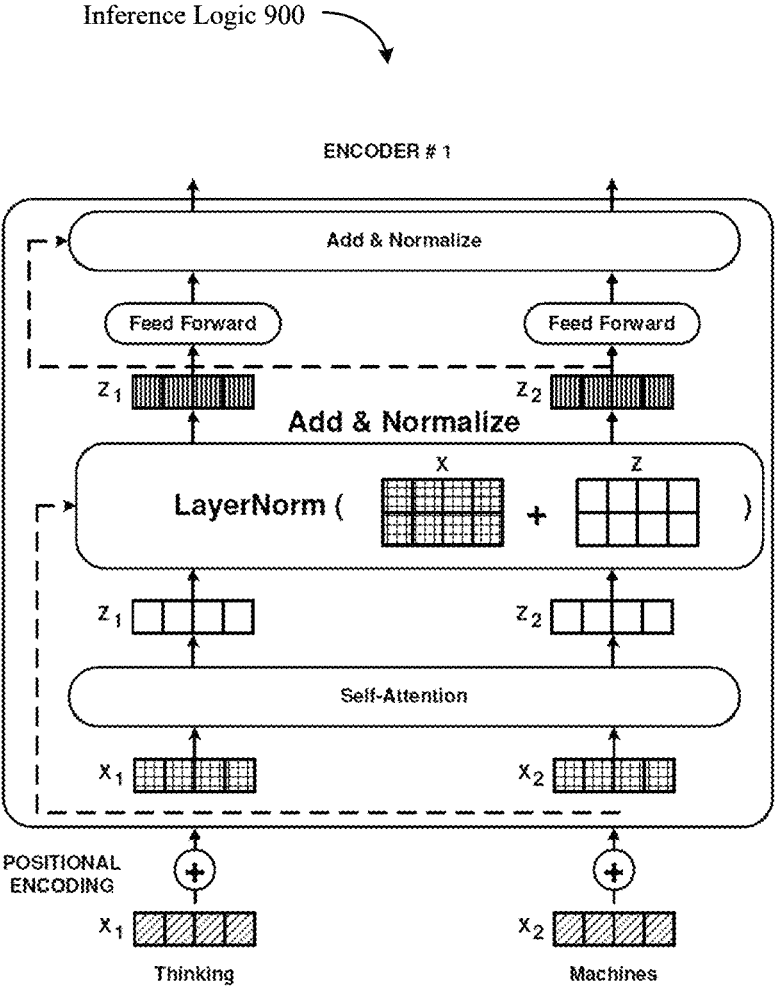
FIG. 14 is a portrayal of one encoder layer of a Transformer network.

FIG. 14 portrays one encoder layer of a Transformer network. Every self-attention layer is surrounded by a residual connection, summing up the output and input of the self-attention. This sum is normalized, and the normalized vectors are fed to a feed-forward layer. Every z vector is fed separately to this feed-forward layer. The feed-forward layer is wrapped in a residual connection and the outcome is normalized too. Often, numerous encoder layers are piled to form the encoder. The output of the encoder is a fixed-size vector for every element of the input sequence.

Just like the encoder, the decoder is built from different decoder layers. In the decoder, a modified version of self-attention takes place. The query vector is only compared to the keys of previous output sequence elements. The elements further in the sequence are not known yet, as they still must be predicted. No information about these output elements may be used.

Encoder-Decoder Blocks of Transformer

Figure 15:
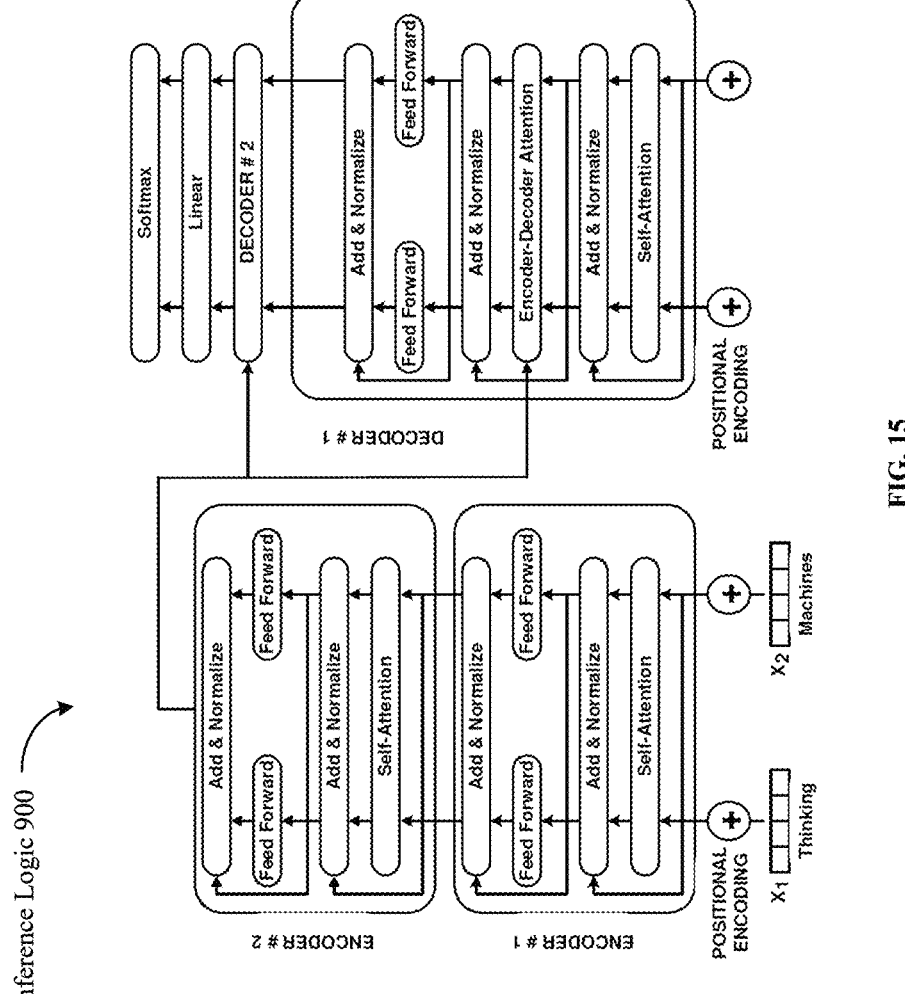
FIG. 15 shows a schematic overview of a Transformer model.
Figures 16A, 16B:
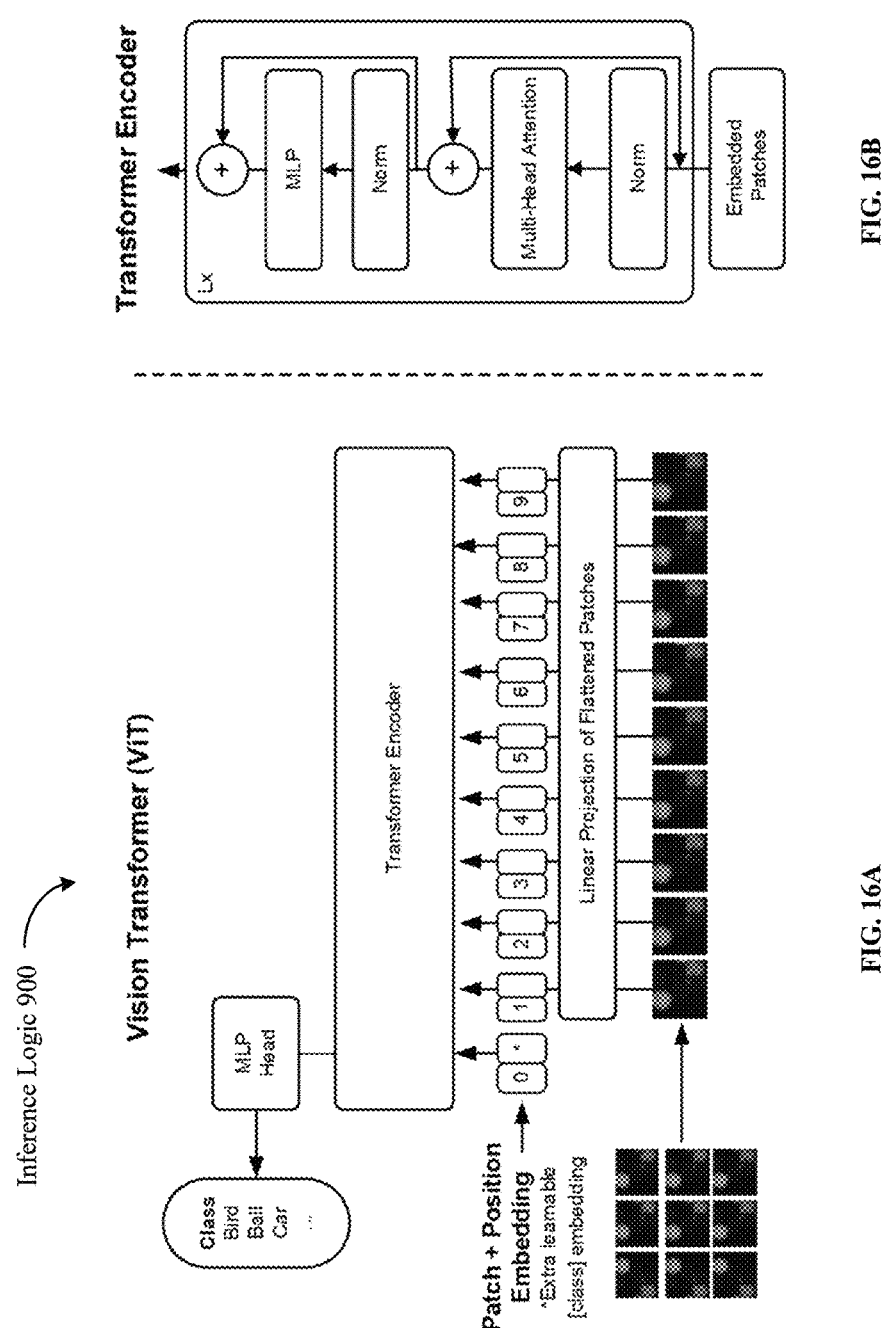
FIGS. 16A and 16B is a depiction of a Vision Transformer (ViT).
Figures 17A, 17B, 17C, 17D:
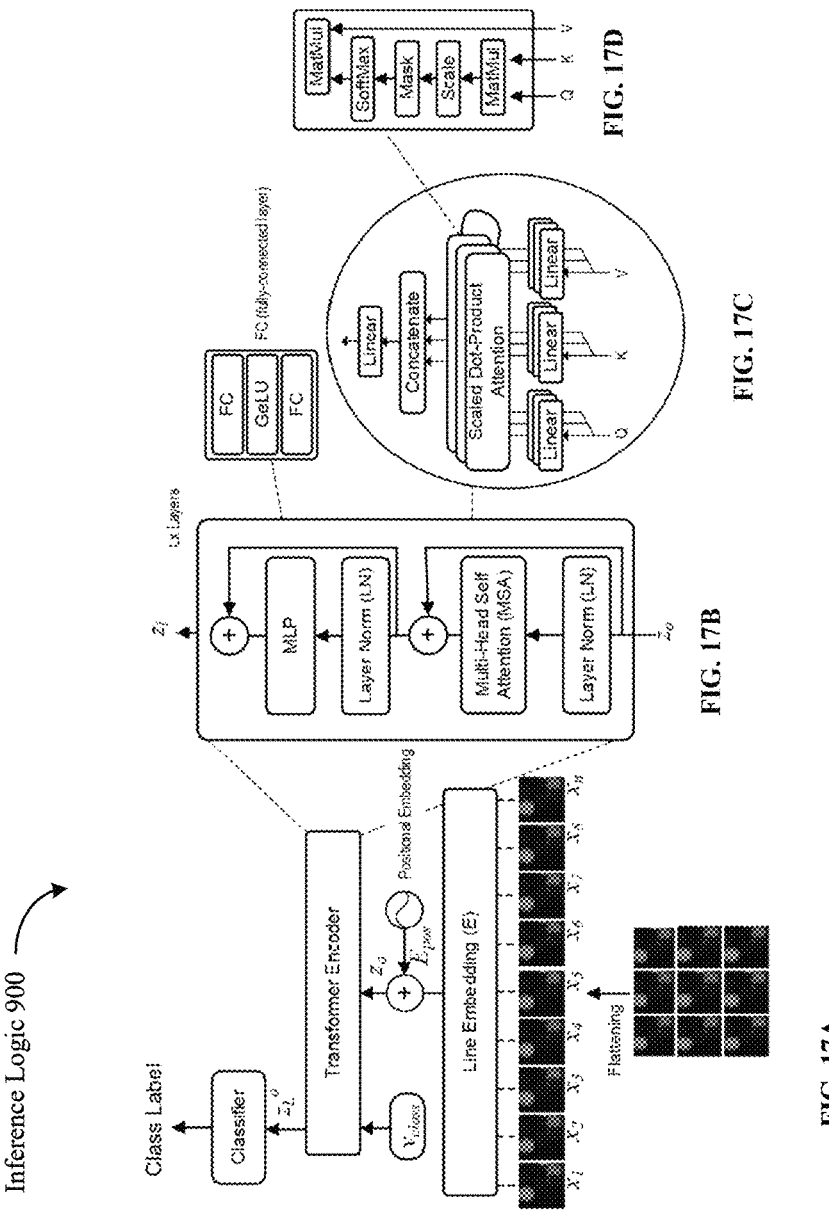
FIG. 17A-D illustrates a processing flow of the Vision Transformer (ViT).

FIG. 15 shows a schematic overview of a Transformer model. Next to a self-attention layer, a layer of encoder-decoder attention is present in the decoder, in which the decoder can examine the last Z vectors of the encoder, providing fluent information transmission. The ultimate decoder layer is a feed-forward layer. All layers are packed in a residual connection. This allows the decoder to examine all previously predicted outputs and all encoded input vectors to predict the next output. Thus, information from the encoder is provided to the decoder, which could improve the predictive capacity. The output vectors of the last decoder layer need to be processed to form the output of the entire system. This is done by a combination of a feed-forward layer and a SoftMax function. The output corresponding to the highest probability is the predicted output value for a subject time step.

For some tasks other than translation, only an encoder is needed. This is true for both document classification and name entity recognition. In these cases, the encoded input vectors are the input of the feed-forward layer and the SoftMax layer. Transformer models have been extensively applied in different NLP fields, such as translation, document summarization, speech recognition, and named entity recognition. These models have applications in the field of biology as well for predicting protein structure and function and labeling DNA sequences.

Vision Transformer

There are extensive applications of transformers in vision including popular recognition tasks (e.g., image classification, object detection, action recognition, and segmentation), generative modeling, multi-modal tasks (e.g., visual-question answering, visual reasoning, and visual grounding), video processing (e.g., activity recognition, video forecasting), low-level vision (e.g., image super-resolution, image enhancement, and colorization) and 3D analysis (e.g., point cloud classification and segmentation).

Transformers were originally developed for NLP and worked with sequences of words. In image classification, we often have a single input image in which the pixels are in a sequence. To reduce the computation required, Vision Transformers (ViTs) cut the input image into a set of fixed-sized patches of pixels. The patches are often 16×16 pixels. They are treated much like words in NLP Transformers. ViTs are depicted in FIGS. 16A, 16B, 16A, 17B, 17C, and 17D. Unfortunately, important positional information is lost because image sets are position-invariant. This problem is solved by adding a learned positional encoding into the image patches.

The computations of the ViT architecture can be summarized as follows. The first layer of a ViT extracts a fixed number of patches from an input image (17A). The patches are then projected to linear embeddings. A special class token vector is added to the sequence of embedding vectors to include all representative information of all tokens through the multi-layer encoding procedure. The class vector is unique to each image. Vectors containing positional information are combined with the embeddings and the class token. The sequence of embedding vectors is passed into the Transformer blocks. The class token vector is extracted from the output of the last Transformer block and is passed into a multilayer perceptron (MLP) head whose output is the final classification. The perceptron takes the normalized input and places the output in categories. It classifies the images. This procedure directly translates into the Python Keras code shown in FIG. 18.

When the input image is split into patches, a fixed patch size is specified before instantiating a ViT. Given the quadratic complexity of attention, patch size has a large effect on the length of training and inference time. A single Transformer block comprises several layers. The first layer implements Layer Normalization, followed by the multi-head attention that is responsible for the performance of ViTs. In the depiction of a Transformer block in FIG. 17B, we can see two arrows. These are residual skip connections. Including skip connection data can simplify the output and improve the results. The output of the multi-head attention is followed again by Layer Normalization. And finally, the output layer is an MLP (Multi-Layer Perceptron) with the GELU (Gaussian Error Linear Unit) activation function.

ViTs can be pretrained and fine-tuned. Pretraining is generally done on a large dataset. Fine-tuning is done on a domain specific dataset.

Domain-specific architectures, like convolutional neural networks (CNNs) or long short-term memory networks (LSTMs), have been derived from the usual architecture of MLPs and suffer from so-called inductive biases that predispose the networks towards a certain output. ViTs stepped in the opposite direction of CNNs and LSTMs and became more general architectures by eliminating inductive biases. A ViT can be seen as a generalization of MLPs because MLPs, after being trained, do not change their weights for different inputs. On the other hand, ViTs compute their attention weights at runtime based on the particular input.

Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

The detailed description of various implementations will be better understood when read in conjunction with the appended drawings. To the extent that the figures illustrate diagrams of the functional blocks of the various implementations, the functional blocks are not necessarily indicative of the division between hardware circuitry. Thus, for example, one or more of the functional blocks (e.g., modules, processors, or memories) may be implemented in a single piece of hardware (e.g., a general-purpose signal processor or a block of random-access memory, hard disk, or the like) or multiple pieces of hardware. Similarly, the programs may be stand-alone programs, may be incorporated as subroutines in an operating system, may be functions in an installed software package, and the like. It should be understood that the various implementations are not limited to the arrangements and instrumentality shown in the drawings.

The processing engines and databases of the figures, designated as modules, can be implemented in hardware or software, and need not be divided up in precisely the same blocks as shown in the figures. Some of the modules can also be implemented on different processors, computers, or servers, or spread among a number of different processors, computers, or servers. In addition, it will be appreciated that some of the modules can be combined, operated in parallel or in a different sequence than that shown in the figures without affecting the functions achieved. The modules in the figures can also be thought of as flowchart steps in a method. A module also need not necessarily have all its code disposed contiguously in memory; some parts of the code can be separated from other parts of the code with code from other modules or other functions disposed in between.

The invention claimed is:

1. A system for analyzing an artwork, the system comprising:

one or more processors, a display unit operably coupled to the one or more processors, and a memory accessible by the processor, the memory storing instructions that when executed by the processor implement a method comprising:

displaying, via a graphical user interface (GUI), wherein the GUI includes an image capture option for receiving an image of an artwork from a user;

pre-processing the received image to enhance image quality for analysis;

analyzing, by a computer vision module, the pre-processed image to generate visual embeddings representing features of the artwork, wherein the computer vision module comprises:

a feature extraction unit configured to apply convolutional neural networks (CNNs) to detect low-level and high-level visual features including brushstrokes, textures, shapes, and color distributions, a generative analysis unit configured to employ generative adversarial networks (GANs) to distinguish between authentic and forged stylistic elements, a sequential analysis unit configured to employ recurrent neural networks (RNNs) or transformer-based models to identify temporal, stylistic, or contextual sequences across related artworks, and an embedding generation unit configured to transform the extracted features, from the feature extraction unit, the generative analysis unit, and the sequential unit, into numerical embeddings;

combining, by an artificial intelligence engine comprising a multimodal fusion module, the visual embeddings with contextual data obtained from a metadata library comprising subject matter identifiers curated by subject matter experts and a statistical identifiers database comprising historical sales records and provenance data to generate feature representations for authentication and valuation;

generating, by an authentication unit, an authentication output indicative of authenticity of the artwork based on the feature representations, compact embeddings optimized for analysis, and self-attention mechanisms to weight relative importance of features;

determining, by a valuation probability calculator, a valuation probability by applying a Bayesian network to integrate the feature representations, the authentication output, and contextual market data, the Bayesian network comprising nodes representing valuation factors and edges representing conditional dependencies among the valuation factors to generate the valuation probability indicating a probable change in valuation of the artwork;

displaying, through the GUI on the display unit, graphical visualizations of the authentication output and the valuation probability corresponding to the artwork; and enabling user interaction with the GUI to view detailed information related to identified art identifiers and valuation probability, and further rendering, on the display unit, an inventory screen comprising a searchable and scrollable list of stored artworks, each entry including a thumbnail image, the inventory identifier, the title, the current price, and an estimated valuation.

2. The system of claim 1, wherein the authentication output comprises an authentication status, a confidence score, and factor-level indicators.

3. The system of claim 1, wherein the valuation probability comprises a probabilistic score of value change, a confidence interval or probability distribution, anomaly indications, and graphical visualizations including at least one of a chart, graph, heat map, or interactive representation showing contributions of visual, contextual, and historical factors.

4. The system of claim 1, wherein the system further receives, through a graphical user interface, user-provided details including artist name, artwork title, year of creation, medium, material, and artwork dimensions, and automatically generating an inventory identifier for the artwork.

5. The system of claim 1, wherein the graphical user interface comprises an "Add Artwork" screen including a dropdown menu for year of creation, wherein a user is selectable to specify a known year or select "Unknown".

6. The system of claim 1, the GUI comprising at least one graphical object to display identified specific subjects in the artwork, wherein the specific subjects include a muse or notable person depicted in the artwork.

7. The system of claim 1, the GUI comprising at least one graphical object displaying the identified art identifiers and their corresponding data, the method further comprising:

receiving user input selecting a particular art identifier; and displaying detailed information related to the selected art identifier in the GUI.

8. The system of claim 1, further comprising: an interface for receiving historical sales data and integrating it into the statistical identifiers database to enhance an accuracy of valuation determinations performed by the valuation probability calculator.

9. The system of claim 1, wherein the graphical visualizations of claim 1 represent valuation results, including probability distributions, anomaly detections, and explainable AI factor contributions generated by an output module of the artificial intelligence engine.

10. The system of claim 1, the GUI comprising a plurality of graphical objects for uploading the image from a database corresponding to the user, categorizing the artworks, and viewing a collection of the artworks.

11. The system of claim 1, the GUI comprising at least one graphical object for enabling the user to send the image via an electronic mail to a system operator, wherein, upon receiving the image by the system operator, the image is uploaded and displayed in the inventory module by the system operator.

12. The system of claim 1, wherein the computer vision module further comprises an image input interface configured to receive the pre-processed image of the artwork.

13. The system of claim 1, wherein the valuation probability calculator for artworks, comprising:

an input interface configured to receive the visual embeddings of an artwork, metadata embeddings, and contextual market data from the AI engine;

a probabilistic modeling unit configured to apply at least one of a probabilistic model to combine the features with historical data and market indicators to represent conditional dependencies among valuation factor to determine a valuation probability indicating a probable change in the valuation of the artwork; and an anomaly detection unit configured to: compare the calculated valuation probability with current market prices to identify deviations, and determine the valuation probability and explanatory factors influencing the valuation to a user device.

14. The system of claim 1, wherein the AI engine further comprises:

a feature integration module configured to receive visual embeddings generated by the computer vision module analyzing the pre-processed image of the artwork, and textual embeddings generated from metadata associated with the artwork;

an output module configured to generate explainable AI results indicative of portions of the artwork image contributing to the valuation probability; and a continuous learning logic configured to train and retrain the artificial intelligence engine using human-in-the-loop (HITL) feedback in which uncertain valuation predictions are annotated by experts and used to train or retrain the AI engine.

15. The system of claim 1, wherein the graphical user interface is further configured to present a human-in-the-loop (HITL) active learning process in which uncertain valuation predictions are visually flagged on the display unit for expert annotation, and wherein the annotations provided through the graphical user interface are stored and used to train or retrain the artificial intelligence engine.

16. The system of claim 1, wherein the graphical user interface is configured to enable subject matter experts to curate and input subject matter identifiers into the metadata library, and wherein the graphical user interface further allows entry, review, and validation of statistical identifiers including at least artist identification, signature presence, size, provenance, or historical sales of the artwork, the curated data being stored in the metadata library and the statistical identifiers database for use by the system.

* * * * *